United States Patent
Lanigan et al.

(10) Patent No.: US 10,518,865 B2
(45) Date of Patent: Dec. 31, 2019

(54) AIRCRAFT HORIZONTAL STABILIZER DESIGN

(71) Applicant: Bell Helicopter Textron Inc., Fort Worth, TX (US)

(72) Inventors: Brendan P. Lanigan, Grapevine, TX (US); Joshua R. O'Neil, Bedford, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 293 days.

(21) Appl. No.: 15/593,241

(22) Filed: May 11, 2017

(65) Prior Publication Data

US 2018/0327078 A1    Nov. 15, 2018

(51) Int. Cl.
*B64C 5/02* (2006.01)
*B64C 27/82* (2006.01)
*B64C 27/06* (2006.01)

(52) U.S. Cl.
CPC ............... *B64C 5/02* (2013.01); *B64C 27/06* (2013.01); *B64C 27/82* (2013.01); *B64C 2027/8281* (2013.01)

(58) Field of Classification Search
CPC ... B64C 5/02; B64C 2027/8281; B64C 27/82; B64C 27/06; B64C 5/06; B64C 2003/142; B64C 2027/8263
USPC ....................................................... 244/87
See application file for complete search history.

(56) References Cited

U.S. PATENT DOCUMENTS

| | | | |
|---|---|---|---|
| 1,506,817 A | 9/1924 | Claudius | |
| 3,506,219 A | 4/1970 | Mouille et al. | |
| 4,809,931 A | 3/1989 | Mouille et al. | |
| 5,108,044 A | 4/1992 | Weiner et al. | |
| 5,252,381 A | 10/1993 | Adler | |
| 2012/0280079 A1 | 11/2012 | Brand et al. | |
| 2013/0313355 A1* | 11/2013 | Gatti | B64C 27/82 244/17.13 |
| 2016/0272296 A1 | 9/2016 | Fink | |
| 2018/0327079 A1 | 11/2018 | Lanigan et al. | |

FOREIGN PATENT DOCUMENTS

| | | |
|---|---|---|
| EP | 0566452 A1 | 10/1993 |
| EP | 3401211 A1 | 11/2018 |
| EP | 3401212 A1 | 11/2018 |
| KR | 20160038768 A | 4/2016 |
| WO | 199011929 A1 | 10/1990 |

(Continued)

OTHER PUBLICATIONS

EPO Search Report issued in EP Application 17191479.9 dated Jan. 16, 2018, 4 pages.

(Continued)

*Primary Examiner* — Claude J Brown
(74) *Attorney, Agent, or Firm* — Patent Capital Group

(57) ABSTRACT

In one embodiment, a horizontal stabilizer comprises an airfoil structure configured to be mounted to an aircraft at a horizontal orientation. The airfoil structure comprises a leading edge, a trailing edge, a top surface, and a bottom surface. Moreover, the airfoil structure is cambered, wherein a camber of the airfoil structure forms a concave slope on the top surface and a convex slope on the bottom surface.

14 Claims, 14 Drawing Sheets

(56) References Cited

FOREIGN PATENT DOCUMENTS

WO      2008006831 A1      1/2008
WO      2015053838 A1      4/2015

OTHER PUBLICATIONS

Summons to Attend Oral Proceedings Pursuant to Rule 115(1) EPC in European Patent Application Serial No. 17191711.5 dated Jun. 26, 2018 (4 pages).
EPO Examination Report issued in EP Application 17191479.9 dated Jun. 14, 2018, 5 pages.
EPO Examination Report issued in EP Application 17191479.9 dated Apr. 6, 2018, 5 pages.
EPO Search Report issued in EP Application 17191711.5 dated Dec. 4, 2017, 4 pages.
Bell 525 Relentless (Product Diagram), Bell Helicopter, A Textron Company; Flight International from Flightglobal , Tim Hall (FRAeS, Fort Worth, Texas), Reed Business Information, Published Nov. 12, 2014. (1 page).
Perry, Dominic, "Analysis: Bell 525 Relentless Cutaway and Technical Description", Flight Global, Flight International, Bell Helicopter, Published Nov. 12, 2014. (8 pages).
EPO Official Action issued in EP Application 17191711.5 dated Feb. 6, 2018, 5 pages.
EPO Examination Report issued in EP Application 17191479.9 dated Jan. 24, 2019, 5 pages.
USPTO Non-Final Office Action in U.S. Appl. No. 15/593,304, dated Jun. 11, 2019.

\* cited by examiner

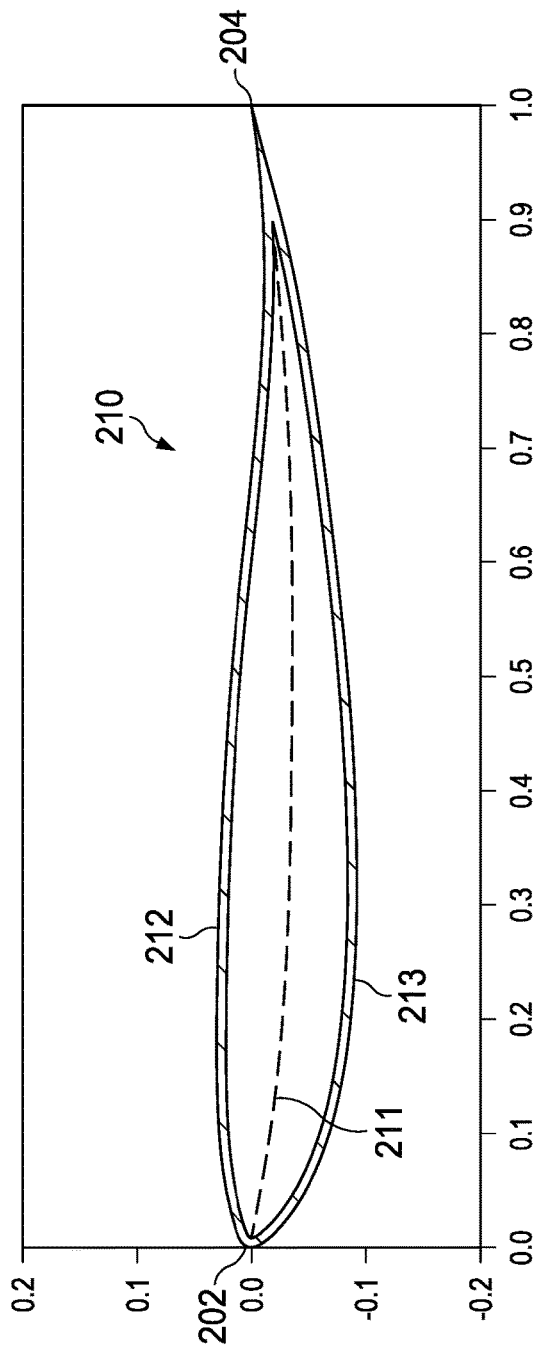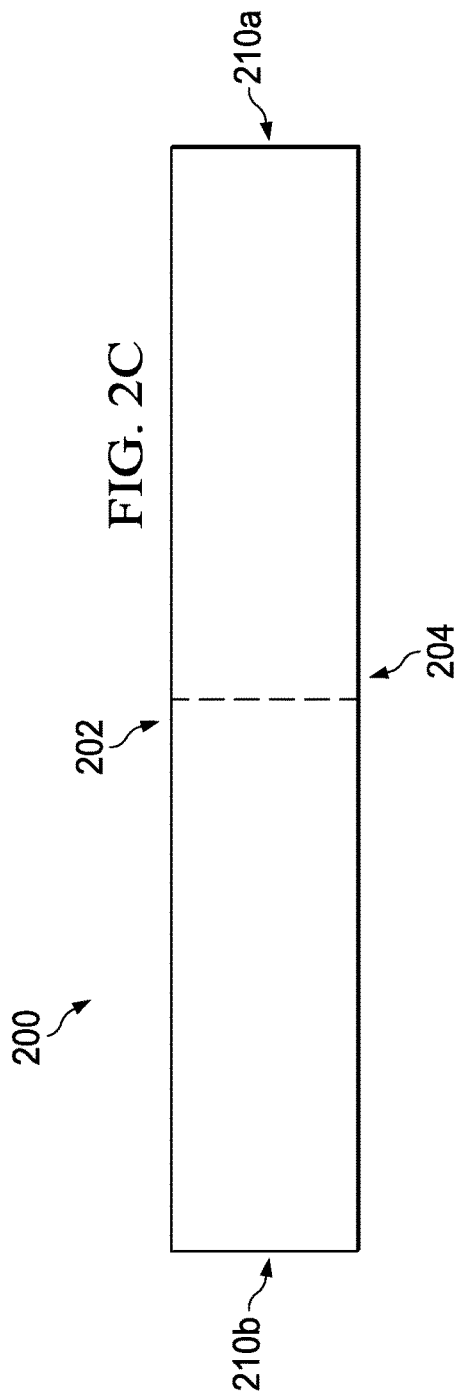

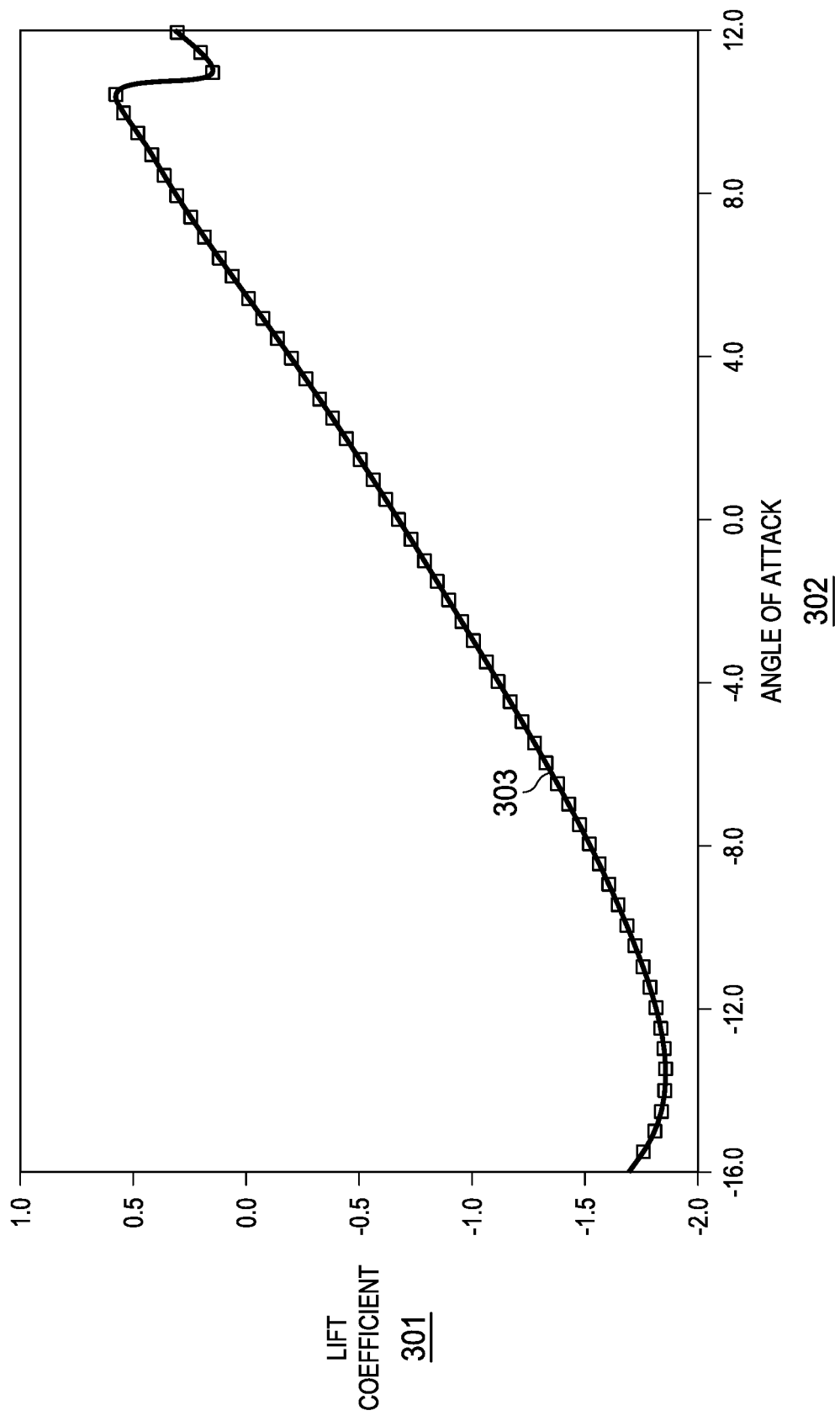

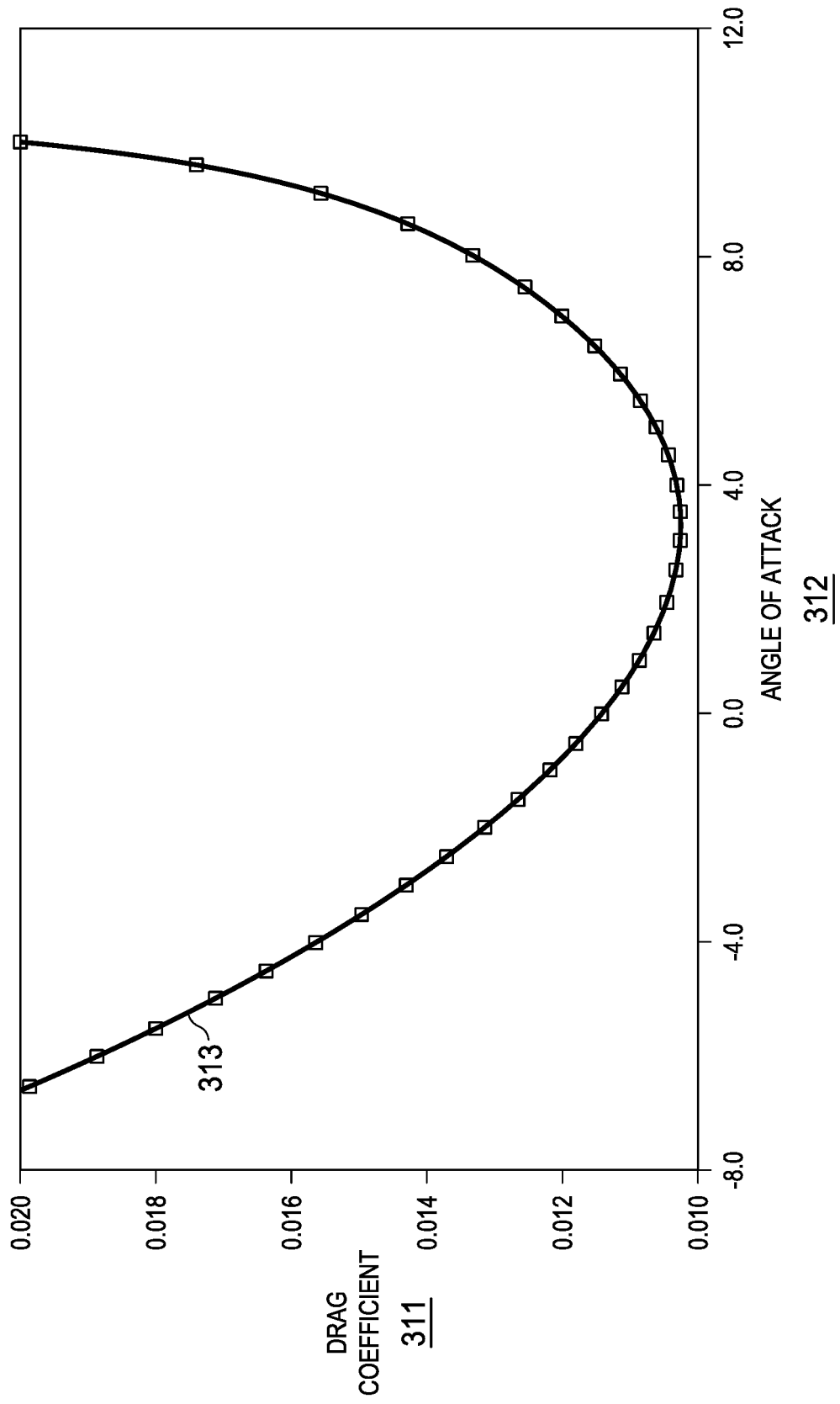

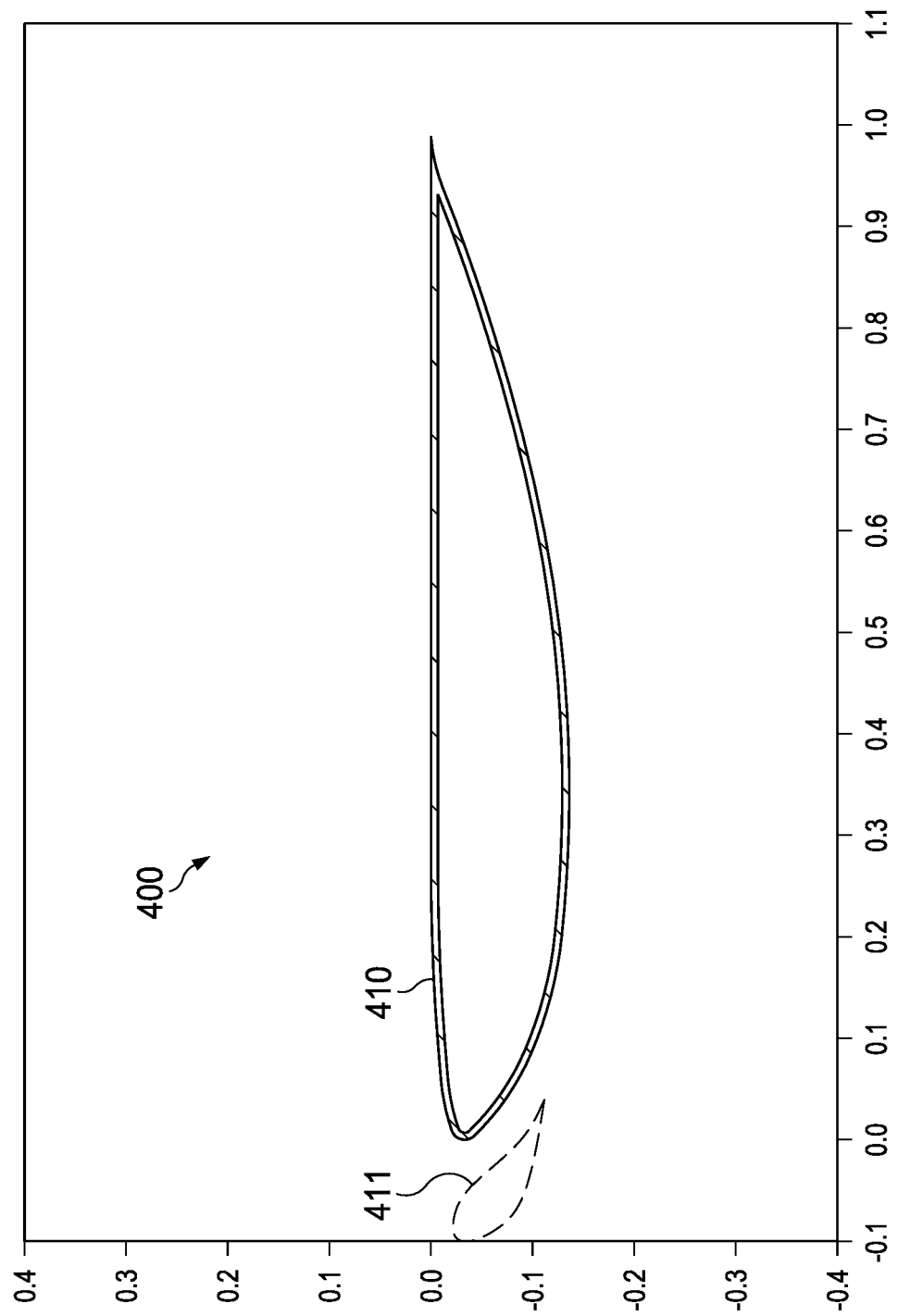

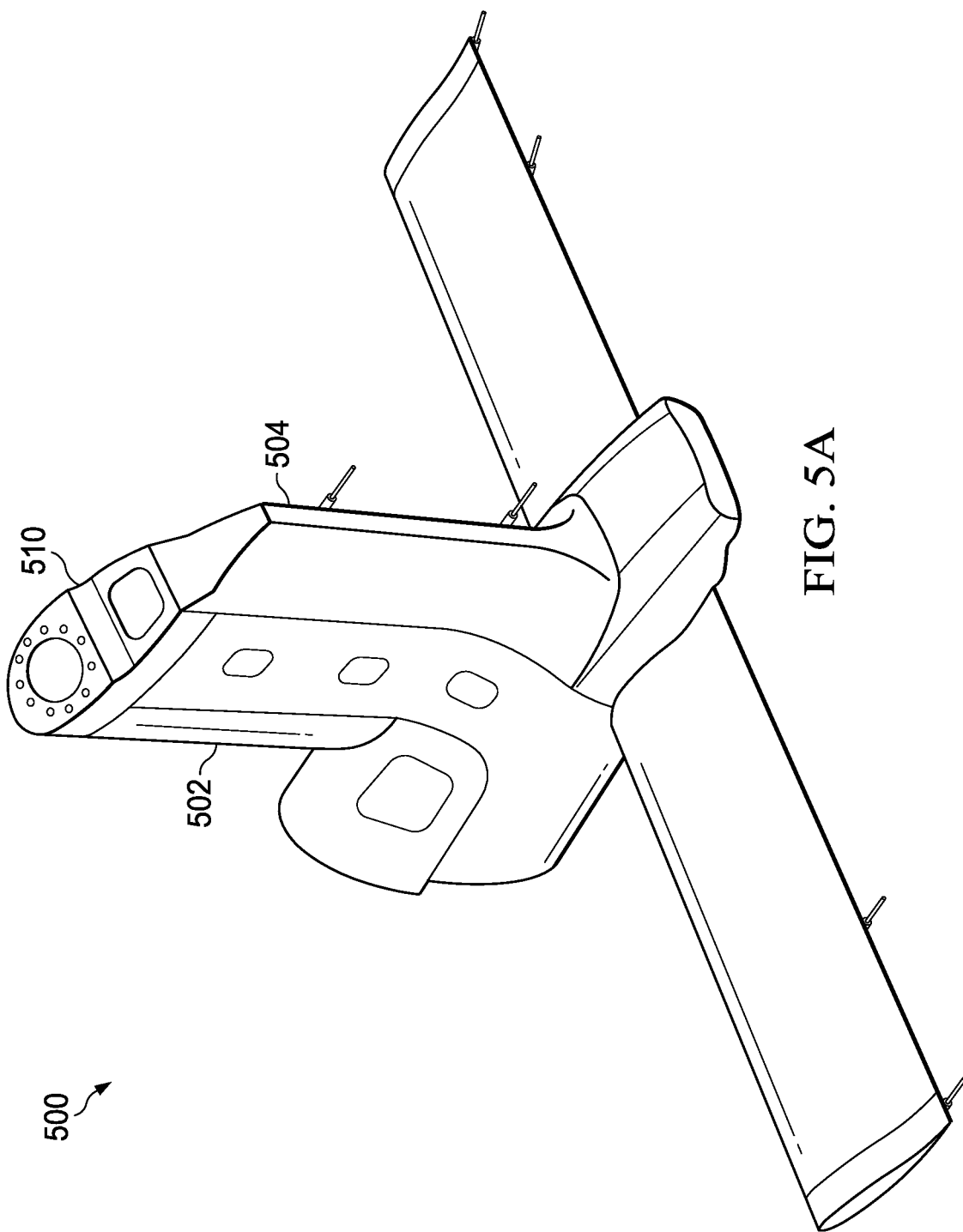

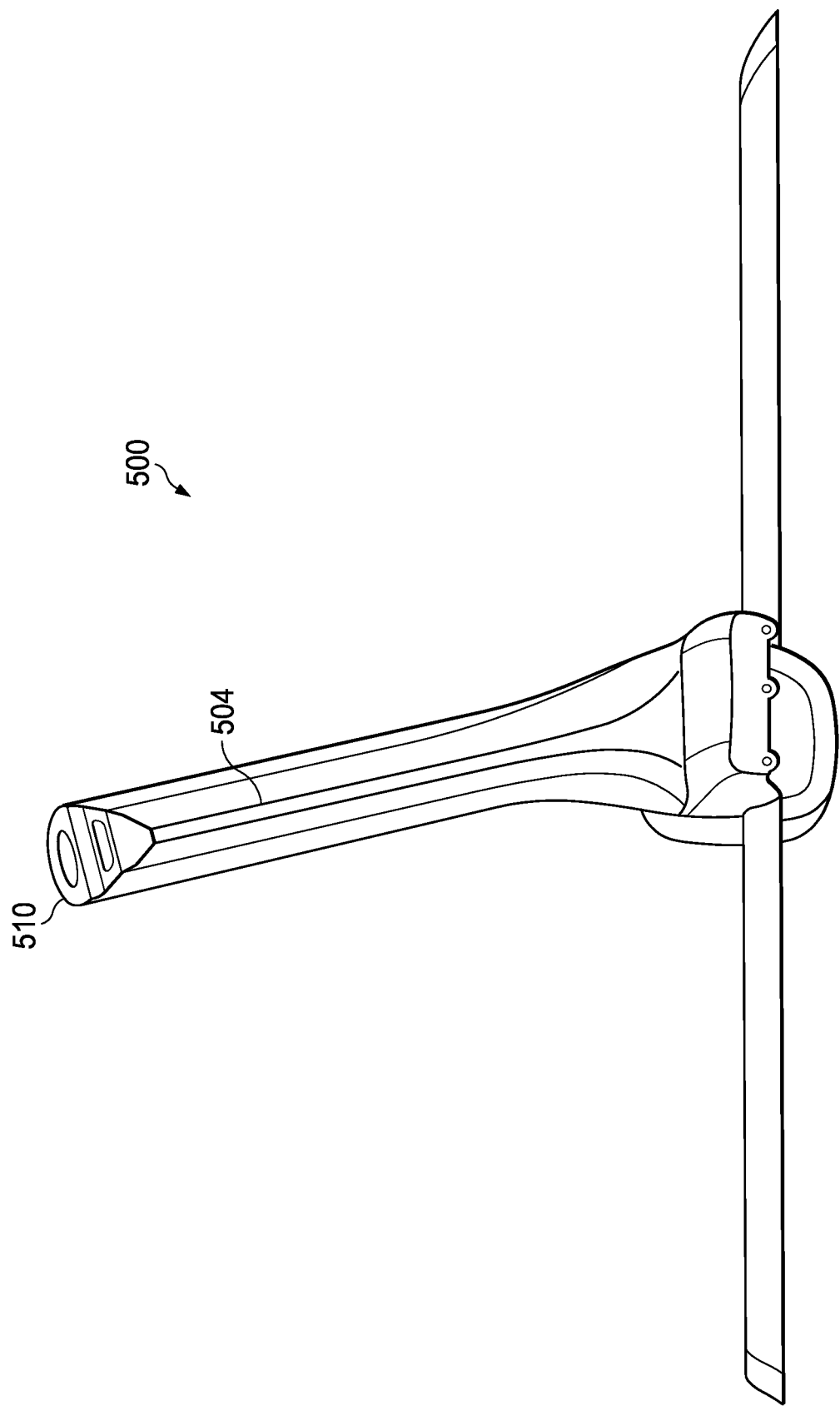

AIRCRAFT HORIZONTAL STABILIZER DESIGN

TECHNICAL FIELD

This disclosure relates generally to aircraft design, and more particularly, though not exclusively, to a design for a horizontal stabilizer.

BACKGROUND

Many aircraft, such as helicopters and other rotorcraft, include a horizontal stabilizer to provide stability and other aerodynamic benefits during flight. The design of a horizontal stabilizer implicates numerous performance considerations and is often an extremely challenging aspect of aircraft design.

SUMMARY

According to one aspect of the present disclosure, a horizontal stabilizer comprises an airfoil structure configured to be mounted to an aircraft at a horizontal orientation. The airfoil structure comprises a leading edge, a trailing edge, a top surface, and a bottom surface. Moreover, the airfoil structure is cambered, wherein a camber of the airfoil structure forms a concave slope on the top surface and a convex slope on the bottom surface.

BRIEF DESCRIPTION OF THE DRAWINGS

FIGS. 2A-C illustrate an example embodiment of a horizontal stabilizer.

FIGS. 3A-B illustrate performance graphs for an example embodiment of a horizontal stabilizer.

FIG. 4 illustrates an example embodiment of a slatted horizontal stabilizer.

FIGS. 5A-F illustrate an example embodiment of a vertical stabilizer.

DETAILED DESCRIPTION

Figure 1:
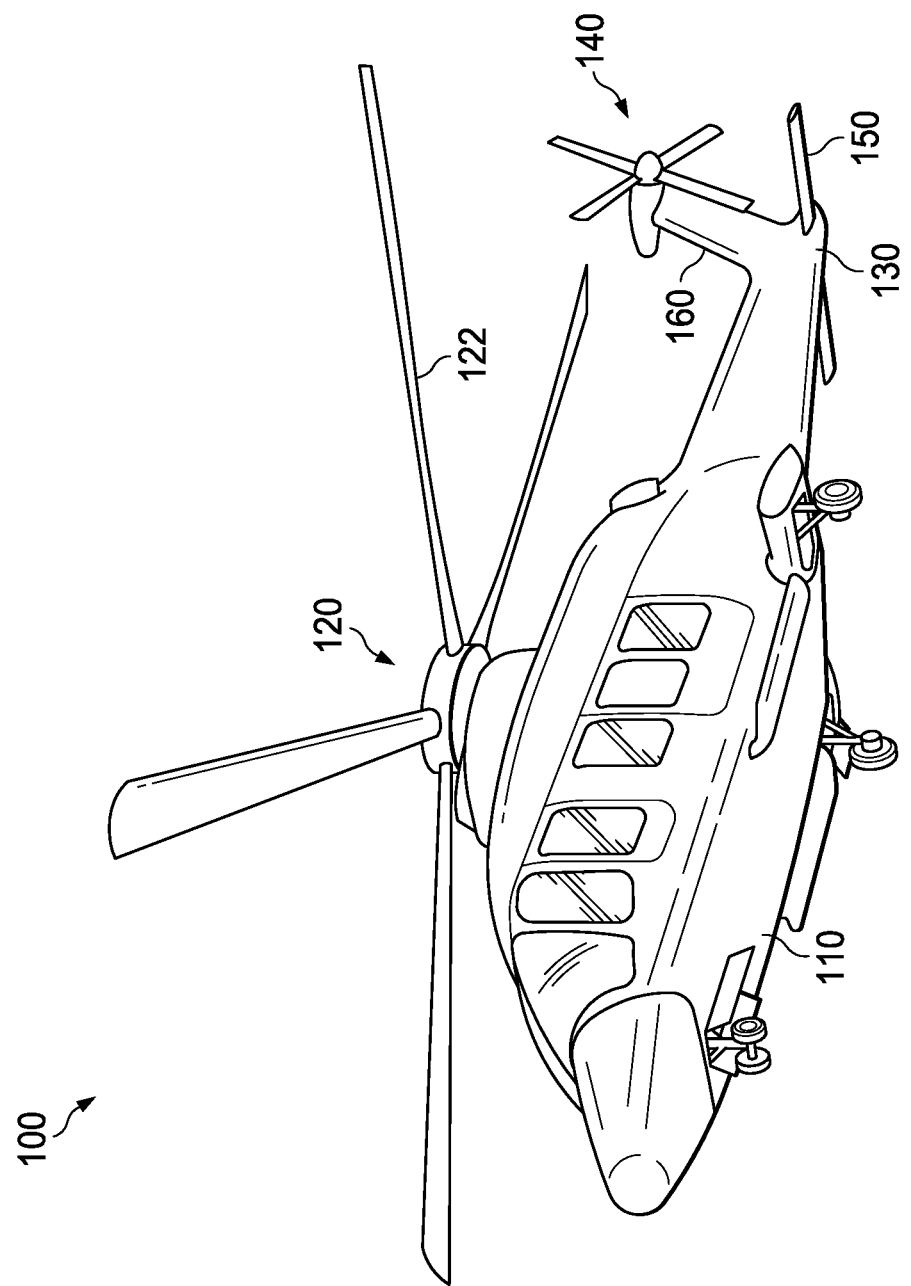
FIG. 1 illustrates an example rotorcraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 100. Rotorcraft 100 includes a fuselage 110, a rotor system 120, and an empennage 130. The fuselage 110 is the main body of the rotorcraft, which may include a cabin for the crew, passengers, and/or cargo, and may also house certain mechanical and electrical components, such as the engine(s), transmission, and flight controls. The rotor system 120 is used to generate lift for the rotorcraft using a plurality of rotating rotor blades 122. For example, torque generated by the engine(s) causes the rotor blades 122 to rotate, which in turn generates lift. Moreover, the pitch of each rotor blade 122 can be adjusted in order to selectively control direction, thrust, and lift for the rotorcraft 100. The empennage 130 is the tail assembly of the rotorcraft. In the illustrated embodiment, the empennage 130 includes a tail rotor system 140, which may be used to provide anti-torque and/or directional control.

In the illustrated embodiment, the empennage 130 also includes a horizontal stabilizer 150 and a vertical stabilizer 160. In general, a stabilizer is an aerodynamic surface or airfoil that produces an aerodynamic lifting force (either positive or negative). For example, a stabilizer may be a fixed or adjustable structure with an airfoil shape, and may also include one or more movable control surfaces. The primary purpose of a stabilizer is to improve stability about a particular axis (e.g., pitch or yaw stability), although a stabilizer can also provide other secondary aerodynamic benefits.

A horizontal stabilizer (e.g., horizontal stabilizer 150) is primarily used to provide stability in pitch, or longitudinal stability. For example, both the rotor and fuselage of a rotorcraft typically have an inherent negative stability derivative in pitch, and accordingly, a horizontal stabilizer may be used to neutralize pitch instability and improve the overall handling qualities of the rotorcraft. A horizontal stabilizer may also be used to generate lift for a rotorcraft, for example, to aid in climb or ascent. In some cases, a horizontal stabilizer may also include one or more movable control surfaces, such as an adjustable slat to aid in generating lift. The design of a horizontal stabilizer (e.g., airfoil shape, size, position on a rotorcraft, control surfaces) implicates numerous performance considerations and is often an extremely challenging aspect of aircraft design.

A vertical stabilizer (e.g., vertical stabilizer 160) is primarily used to provide stability in yaw, or directional stability. Although considerable yaw stability and control is often provided by a tail rotor, a vertical stabilizer may be used to supplement the performance of the tail rotor and/or reduce the performance requirements of the tail rotor. Accordingly, designing a vertical stabilizer and a tail rotor often implicates numerous interrelated performance considerations, particularly due to the interaction between their respective airflows. For example, a smaller vertical stabilizer may reduce the adverse effects on tail rotor efficiency, but may adversely impact yaw stability and other design requirements (e.g., sideward flight performance, internal capacity for housing components within the vertical stabilizer). Accordingly, various performance considerations must be carefully balanced when designing a vertical stabilizer.

This disclosure describes various embodiments of horizontal and vertical stabilizers with designs that balance a variety of performance considerations to provide optimal performance. For example, this disclosure describes embodiments of a horizontal stabilizer that is designed to provide strong aerodynamic performance (e.g., pitch stability and/or generating sufficient lift during climb or ascent) without using slats. The horizontal stabilizer uses a tailored airfoil design that is cambered and may form a concave slope on the top surface and/or a convex slope on the bottom surface. In some embodiments, the horizontal stabilizer may be mounted on the aft end of a rotorcraft. By obviating the need for slats, this horizontal stabilizer design reduces complexity without a performance penalty, thus resulting in a more cost-efficient and reliable solution. Moreover, eliminating the slats similarly eliminates the need to provide anti-icing for the slats, thus providing a further reduction in complexity.

As another example, this disclosure describes embodiments of a vertical stabilizer that is designed to provide strong aerodynamic performance, while also serving as a structural mount for a high tail rotor and as the housing for certain internal components (e.g., the tail rotor driveshaft and other tail rotor components). Accordingly, the vertical stabilizer uses a tailored airfoil design that satisfies various design criteria, including strong aerodynamic performance (e.g., yaw stability, anti-torque control, minimal flow separation and drag), dimensions large enough to house various components internally, easy maintenance access (e.g., in the event of a bird strike), and/or reduced manufacturing complexity. In some embodiments, for example, the vertical stabilizer may have a cambered airfoil shape that provides the requisite yaw stability and anti-torque control while also minimizing flow separation and drag. The cambered airfoil shape, for example, may enable the vertical stabilizer to provide a portion of the anti-torque required in forward flight (e.g., reducing the anti-torque requirements and power consumption of the tail rotor), and/or may also provide sufficient anti-torque to allow continued flight in the event of a tail rotor failure. The cambered airfoil shape may also enable the vertical stabilizer to provide sufficient aerodynamic side-force to offset the tail rotor thrust in forward flight, thus minimizing tail rotor flapping and cyclic loads and maximizing the fatigue life of components. Moreover, in some embodiments, the vertical stabilizer may have a blunt trailing edge (rather than a pointed trailing edge) in order to reduce the thickness tapering on the aft end without modifying the desired chord length, thus minimizing flow separation and drag while also reducing manufacturing complexity.

Example embodiments of a horizontal stabilizer and vertical stabilizer are described below with more particular reference to the remaining FIGURES. Moreover, it should be appreciated that rotorcraft 100 of FIG. 1 is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples.

Figure 2A:
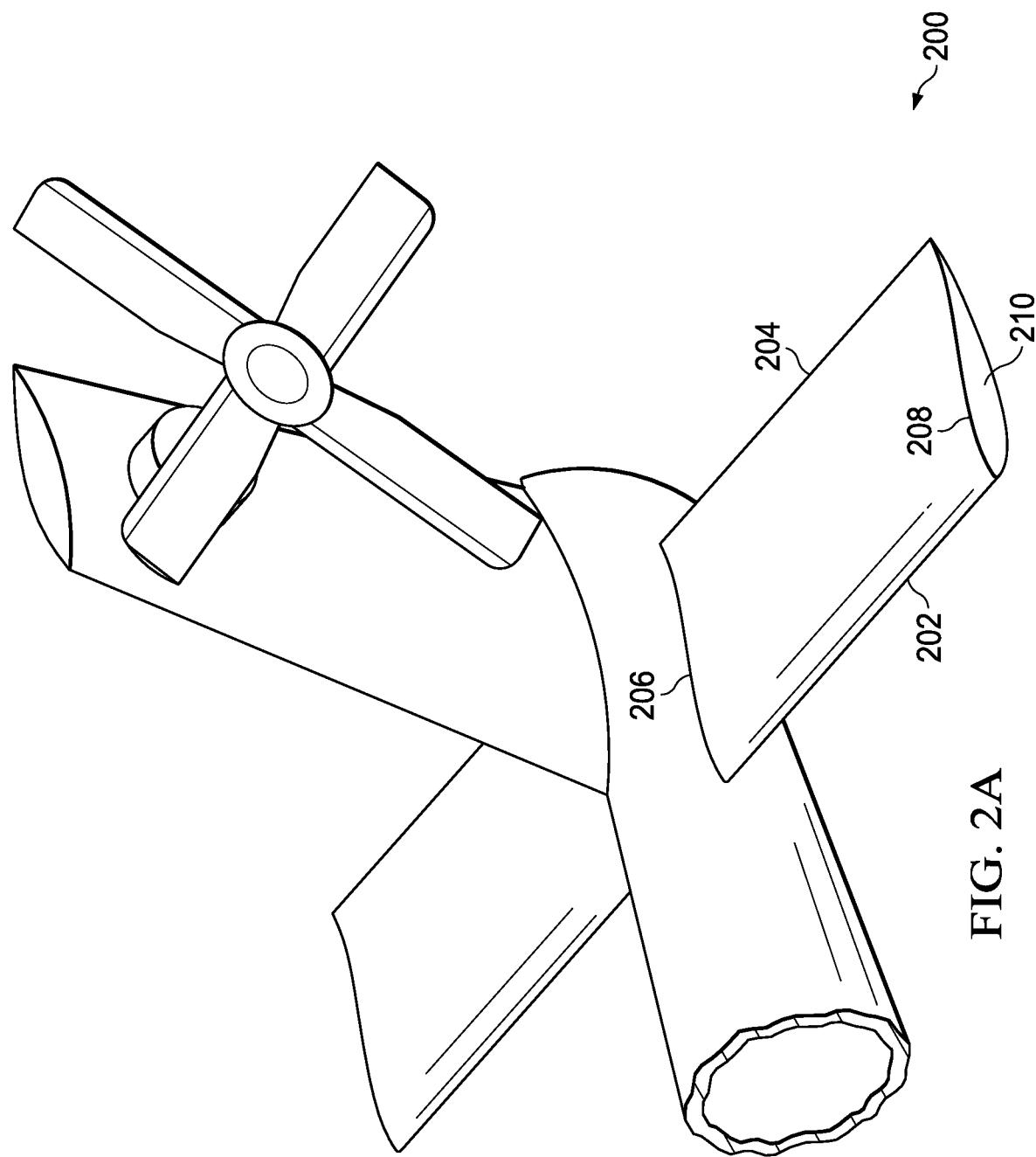

FIGS. 2A-C illustrate an example embodiment of a horizontal stabilizer 200. As described further below, FIG. 2A illustrates a three-dimensional view of the horizontal stabilizer, FIG. 2B illustrates the airfoil shape of the horizontal stabilizer, and FIG. 2C illustrates a two-dimensional view of the horizontal stabilizer.

FIG. 2A illustrates a three-dimensional view of horizontal stabilizer 200. In the illustrated embodiment, horizontal stabilizer 200 is mounted on the aft end of a rotorcraft. In some embodiments, for example, horizontal stabilizer 200 may be mounted on the aft spar structure of a vertical stabilizer for simplicity and more effective use of tail volume. In the illustrated embodiment, horizontal stabilizer 200 includes a leading edge 202, trailing edge 204, inboard end 206, and outboard end 208. Moreover, horizontal stabilizer 200 is designed using an aerodynamic airfoil shape 210 that is cambered and forms a concave slope on the top surface and a convex slope on the bottom surface. This airfoil shape 210 provides various aerodynamic benefits, including favorable pitch stability and lift coefficients (e.g., increasing the amount of lift produced at a given angle of attack), favorable stall characteristics (e.g., enabling ascent at higher angles of attack without stalling, thus resulting in faster ascent), and a favorable overall lift-to-drag ratio. Notably, this aerodynamic airfoil shape 210 enables horizontal stabilizer 200 to achieve these aerodynamic benefits even without using slats or other types of adjustable control surfaces. By obviating the need for slats, this horizontal stabilizer design reduces complexity and weight without a performance penalty, and thus results in a more cost-efficient and reliable design. Moreover, eliminating the slats similarly eliminates the need to provide anti-icing for the slats, thus providing a further reduction in complexity.

FIG. 2B illustrates the airfoil shape 210 of horizontal stabilizer 200. The illustrated airfoil shape 210 includes a leading edge 202, trailing edge 204, top surface 212, and bottom surface 213. The illustrated airfoil shape 210 is also cambered and forms a concave slope on the top surface 212 and a convex slope on the bottom surface 213. The mean camber line 211 of airfoil shape 210 is also shown (e.g., the line drawn halfway between the upper and lower surfaces of the airfoil). Camber refers to the asymmetry between the top and the bottom surfaces of an airfoil, and is used in airfoil designs to provide various aerodynamic benefits.

Compared to the illustrated airfoil shape 210, other horizontal stabilizer airfoil designs may have relatively less camber, a flat top or bottom surface, and/or slats for producing additional lift (e.g., the slatted horizontal stabilizer 400 of FIG. 4). The illustrated airfoil shape 210, however, eliminates the need for slats by using an aerodynamic airfoil design that has more camber 211 and forms a concave slope on the top surface 212 and a convex slope on the bottom surface 213. As described throughout this disclosure, the cambered airfoil shape 210 of horizontal stabilizer 200 provides various aerodynamic benefits, including pitch stability, a higher maximum lift coefficient (e.g., increasing the amount of lift produced at a given angle of attack), improved stall characteristics (e.g., ascending at higher angles of attack without stalling and thus resulting in faster ascent), and an improved lift-to-drag ratio.

Example design parameters (e.g., coordinates, camber, and thickness) for the horizontal stabilizer airfoil shape of FIG. 2B are provided in TABLE 1.

TABLE 1

Design parameters for horizontal stabilizer airfoil shape (FIG. 2B)

| | | Y Coordinates | | | |
|---|---|---|---|---|---|
| Point | X Coordinates | Upper Surface | Lower Surface | Camber | Thickness |
| 1 | 0 | 0 | 0 | 0 | 0 |
| 2 | 0.001049 | 0.0041355 | −0.0061515 | −0.001008 | 0.010287 |
| 3 | 0.002508 | 0.0060715 | −0.0098295 | −0.001879 | 0.015901 |
| 4 | 0.004466 | 0.00782 | −0.013356 | −0.002768 | 0.021176 |
| 5 | 0.0056 | 0.0086285 | −0.0150565 | −0.003214 | 0.023685 |
| 6 | 0.006827 | 0.0093995 | −0.0167235 | −0.003662 | 0.026123 |
| 7 | 0.008141 | 0.010138 | −0.018354 | −0.004108 | 0.028492 |
| 8 | 0.009539 | 0.010846 | −0.019948 | −0.004551 | 0.030794 |
| 9 | 0.011021 | 0.0115255 | −0.0215215 | −0.004998 | 0.033047 |
| 10 | 0.012584 | 0.0121825 | −0.0230765 | −0.005447 | 0.035259 |
| 11 | 0.01423 | 0.012818 | −0.024616 | −0.005899 | 0.037434 |
| 12 | 0.015958 | 0.0134345 | −0.0261425 | −0.006354 | 0.039577 |
| 13 | 0.017769 | 0.014033 | −0.027659 | −0.006813 | 0.041692 |
| 14 | 0.019666 | 0.014615 | −0.029167 | −0.007276 | 0.043782 |
| 15 | 0.021651 | 0.015183 | −0.030669 | −0.007743 | 0.045852 |
| 16 | 0.023725 | 0.015738 | −0.032168 | −0.008215 | 0.047906 |
| 17 | 0.025891 | 0.0162805 | −0.0336645 | −0.008692 | 0.049945 |
| 18 | 0.028152 | 0.0168105 | −0.0351605 | −0.009175 | 0.051971 |
| 19 | 0.030511 | 0.01733 | −0.036656 | −0.009663 | 0.053986 |
| 20 | 0.032972 | 0.01784 | −0.038154 | −0.010157 | 0.055994 |
| 21 | 0.035543 | 0.018339 | −0.039655 | −0.010658 | 0.057994 |
| 22 | 0.038211 | 0.01883 | −0.04116 | −0.011165 | 0.05999 |
| 23 | 0.040997 | 0.0193115 | −0.0426675 | −0.011678 | 0.061979 |
| 24 | 0.043899 | 0.019783 | −0.044181 | −0.012199 | 0.063964 |
| 25 | 0.046922 | 0.020247 | −0.045699 | −0.012726 | 0.065946 |
| 26 | 0.050071 | 0.0207025 | −0.0472225 | −0.01326 | 0.067925 |
| 27 | 0.053349 | 0.02115 | −0.048752 | −0.013801 | 0.069902 |
| 28 | 0.056763 | 0.021589 | −0.050287 | −0.014349 | 0.071876 |
| 29 | 0.060316 | 0.0220195 | −0.0518235 | −0.014902 | 0.073843 |
| 30 | 0.064015 | 0.0224425 | −0.0533645 | −0.015461 | 0.075807 |
| 31 | 0.067865 | 0.0228565 | −0.0549105 | −0.016027 | 0.077767 |
| 32 | 0.071873 | 0.0232635 | −0.0564595 | −0.016598 | 0.079723 |
| 33 | 0.076043 | 0.023661 | −0.058013 | −0.017176 | 0.081674 |
| 34 | 0.080383 | 0.0240495 | −0.0595695 | −0.017776 | 0.083619 |
| 35 | 0.084899 | 0.0244305 | −0.0611265 | −0.018348 | 0.085557 |
| 36 | 0.089598 | 0.024802 | −0.062684 | −0.018941 | 0.087486 |
| 37 | 0.094487 | 0.025164 | −0.06424 | −0.019538 | 0.089404 |
| 38 | 0.099575 | 0.0255165 | −0.0657965 | −0.020139 | 0.091311 |
| 39 | 0.104868 | 0.02586 | −0.067344 | −0.020742 | 0.093204 |
| 40 | 0.110374 | 0.0261925 | −0.0688845 | −0.021346 | 0.095077 |
| 41 | 0.116103 | 0.026514 | −0.070416 | −0.021951 | 0.09693 |
| 42 | 0.122064 | 0.026815 | −0.071927 | −0.022556 | 0.098742 |
| 43 | 0.128265 | 0.0270915 | −0.0734195 | −0.023164 | 0.100511 |
| 44 | 0.134717 | 0.027345 | −0.074891 | −0.023773 | 0.102236 |
| 45 | 0.141428 | 0.0275725 | −0.0763385 | −0.024383 | 0.103911 |
| 46 | 0.14841 | 0.0277745 | −0.0777585 | −0.024992 | 0.105533 |
| 47 | 0.155673 | 0.02795 | −0.079148 | −0.025599 | 0.107098 |
| 48 | 0.163227 | 0.028097 | −0.080503 | −0.026203 | 0.1086 |
| 49 | 0.171086 | 0.028215 | −0.081819 | −0.026802 | 0.110034 |
| 50 | 0.17926 | 0.028302 | −0.083094 | −0.027396 | 0.111396 |
| 51 | 0.187762 | 0.0283585 | −0.0843225 | −0.027982 | 0.112681 |
| 52 | 0.196605 | 0.028381 | −0.085501 | −0.02856 | 0.113882 |
| 53 | 0.205803 | 0.02837 | −0.086624 | −0.029127 | 0.114994 |
| 54 | 0.21537 | 0.028323 | −0.087687 | −0.029682 | 0.11601 |
| 55 | 0.22532 | 0.028238 | −0.088678 | −0.03022 | 0.116916 |
| 56 | 0.235669 | 0.028115 | −0.089597 | −0.030741 | 0.117712 |
| 57 | 0.246432 | 0.0279495 | −0.0904395 | −0.031245 | 0.118389 |
| 58 | 0.257627 | 0.0277425 | −0.0912005 | −0.031729 | 0.118943 |
| 59 | 0.26927 | 0.0274895 | −0.0918735 | −0.032192 | 0.119363 |
| 60 | 0.281379 | 0.027191 | −0.092453 | −0.032631 | 0.119644 |
| 61 | 0.293972 | 0.026843 | −0.092931 | −0.033044 | 0.119774 |
| 62 | 0.30707 | 0.026443 | −0.093301 | −0.033429 | 0.119744 |
| 63 | 0.320691 | 0.0259905 | −0.0935545 | −0.033782 | 0.119545 |
| 64 | 0.334858 | 0.0254805 | −0.0936865 | −0.034103 | 0.119167 |
| 65 | 0.349591 | 0.024906 | −0.093694 | −0.034394 | 0.1186 |
| 66 | 0.364911 | 0.0242275 | −0.0935795 | −0.034676 | 0.117807 |
| 67 | 0.380842 | 0.0234335 | −0.0933275 | −0.034947 | 0.116761 |
| 68 | 0.397407 | 0.0225125 | −0.0929125 | −0.0352 | 0.115425 |
| 69 | 0.414631 | 0.021459 | −0.092307 | −0.035424 | 0.113766 |
| 70 | 0.432539 | 0.0202625 | −0.0914885 | −0.035613 | 0.111751 |
| 71 | 0.451158 | 0.018916 | −0.090436 | −0.03576 | 0.109352 |
| 72 | 0.470515 | 0.0174085 | −0.0891365 | −0.035864 | 0.106545 |
| 73 | 0.490641 | 0.015732 | −0.087582 | −0.035925 | 0.103314 |
| 74 | 0.510757 | 0.013951 | −0.085843 | −0.035946 | 0.099794 |
| 75 | 0.530125 | 0.012143 | −0.084015 | −0.035936 | 0.096158 |
| 76 | 0.548773 | 0.0103215 | −0.0821395 | −0.035909 | 0.092461 |
| 77 | 0.566729 | 0.0084995 | −0.0802435 | −0.035872 | 0.088743 |
| 78 | 0.584023 | 0.0067255 | −0.0783555 | −0.035815 | 0.085081 |
| 79 | 0.60068 | 0.0050175 | −0.0764895 | −0.035736 | 0.081507 |
| 80 | 0.616726 | 0.003382 | −0.074644 | −0.035631 | 0.078026 |
| 81 | 0.632183 | 0.001822 | −0.072824 | −0.035501 | 0.074646 |
| 82 | 0.647075 | 0.0003415 | −0.0710295 | −0.035344 | 0.071371 |
| 83 | 0.661421 | −0.0010575 | −0.0692605 | −0.035159 | 0.068203 |
| 84 | 0.675242 | −0.0023775 | −0.0675185 | −0.034948 | 0.065141 |
| 85 | 0.688558 | −0.0036175 | −0.0658025 | −0.03471 | 0.062185 |
| 86 | 0.701387 | −0.0047775 | −0.0641125 | −0.034445 | 0.059335 |
| 87 | 0.713748 | −0.005859 | −0.062447 | −0.034153 | 0.056588 |
| 88 | 0.725657 | −0.006866 | −0.060806 | −0.033836 | 0.05394 |
| 89 | 0.737131 | −0.0077995 | −0.0591885 | −0.033494 | 0.051389 |
| 90 | 0.748186 | −0.008662 | −0.05759 | −0.033126 | 0.048928 |
| 91 | 0.758838 | −0.0094555 | −0.0560105 | −0.032733 | 0.046555 |
| 92 | 0.7691 | −0.0101855 | −0.0544465 | −0.032316 | 0.044261 |
| 93 | 0.778987 | −0.010853 | −0.052895 | −0.031874 | 0.042042 |
| 94 | 0.788514 | −0.0114475 | −0.0513505 | −0.031399 | 0.039903 |
| 95 | 0.797695 | −0.011948 | −0.049808 | −0.030878 | 0.03786 |
| 96 | 0.806541 | −0.012369 | −0.048267 | −0.030318 | 0.035898 |
| 97 | 0.815064 | −0.0127205 | −0.0467295 | −0.029725 | 0.034009 |
| 98 | 0.823276 | −0.0130115 | −0.0451965 | −0.029104 | 0.032185 |
| 99 | 0.831187 | −0.0132465 | −0.0436695 | −0.028458 | 0.030423 |
| 100 | 0.838808 | −0.0134345 | −0.0421495 | −0.027792 | 0.028715 |
| 101 | 0.84615 | −0.013577 | −0.040639 | −0.027108 | 0.027062 |
| 102 | 0.853222 | −0.0136795 | −0.0391425 | −0.026411 | 0.025463 |
| 103 | 0.860035 | −0.013744 | −0.037658 | −0.025701 | 0.023914 |
| 104 | 0.866597 | −0.0137735 | −0.0361925 | −0.024983 | 0.022419 |
| 105 | 0.872918 | −0.013771 | −0.034747 | −0.024259 | 0.020976 |
| 106 | 0.879007 | −0.013737 | −0.033323 | −0.02353 | 0.019586 |
| 107 | 0.884871 | −0.013675 | −0.031925 | −0.0228 | 0.01825 |
| 108 | 0.89052 | −0.013585 | −0.030553 | −0.022069 | 0.016968 |
| 109 | 0.89596 | −0.0134685 | −0.0292115 | −0.02134 | 0.015743 |
| 110 | 0.901199 | −0.0133275 | −0.0279005 | −0.020614 | 0.014573 |
| 111 | 0.906245 | −0.013163 | −0.026623 | −0.019893 | 0.01346 |
| 112 | 0.911104 | −0.0129745 | −0.0253775 | −0.019176 | 0.012403 |
| 113 | 0.915783 | −0.0127645 | −0.0241675 | −0.018466 | 0.011403 |
| 114 | 0.920289 | −0.012532 | −0.022992 | −0.017762 | 0.01046 |
| 115 | 0.924627 | −0.0122785 | −0.0218535 | −0.017066 | 0.009575 |
| 116 | 0.928804 | −0.0120045 | −0.0207495 | −0.016377 | 0.008745 |
| 117 | 0.932825 | −0.011709 | −0.019681 | −0.015695 | 0.007972 |
| 118 | 0.936696 | −0.011393 | −0.018647 | −0.01502 | 0.007254 |
| 119 | 0.940422 | −0.0110565 | −0.0176495 | −0.014353 | 0.006593 |
| 120 | 0.944008 | −0.0107 | −0.016686 | −0.013693 | 0.005986 |
| 121 | 0.947458 | −0.010323 | −0.015755 | −0.013039 | 0.005432 |
| 122 | 0.950777 | −0.009926 | −0.014858 | −0.012392 | 0.004932 |
| 123 | 0.95397 | −0.009507 | −0.013993 | −0.01175 | 0.004486 |
| 124 | 0.957041 | −0.0090685 | −0.0131595 | −0.011114 | 0.004091 |
| 125 | 0.959993 | −0.0086055 | −0.0123565 | −0.010481 | 0.003751 |
| 126 | 0.962829 | −0.008122 | −0.011584 | −0.009853 | 0.003462 |
| 127 | 0.965554 | −0.007614 | −0.010842 | −0.009228 | 0.003228 |
| 128 | 0.968171 | −0.0070825 | −0.0101275 | −0.008605 | 0.003045 |
| 129 | 0.970682 | −0.0065245 | −0.0094415 | −0.007983 | 0.002917 |
| 130 | 0.973089 | −0.005939 | −0.008783 | −0.007361 | 0.002844 |
| 131 | 0.975395 | −0.0053265 | −0.0081515 | −0.006739 | 0.002825 |
| 132 | 0.977612 | −0.00472 | −0.007544 | −0.006132 | 0.002824 |
| 133 | 0.979747 | −0.004135 | −0.006959 | −0.005547 | 0.002824 |
| 134 | 0.981804 | −0.003572 | −0.006396 | −0.004984 | 0.002824 |
| 135 | 0.983785 | −0.0030285 | −0.0058535 | −0.004441 | 0.002825 |
| 136 | 0.985693 | −0.002507 | −0.005331 | −0.003919 | 0.002824 |
| 137 | 0.987531 | −0.0020025 | −0.0048275 | −0.003415 | 0.002825 |
| 138 | 0.989302 | −0.001518 | −0.004342 | −0.00293 | 0.002824 |
| 139 | 0.991007 | −0.001051 | −0.003875 | −0.002463 | 0.002824 |
| 140 | 0.99265 | −0.0006005 | −0.0034255 | −0.002013 | 0.002825 |
| 141 | 0.994232 | −0.0001675 | −0.0029925 | −0.00158 | 0.002825 |

TABLE 1-continued

Design parameters for horizontal stabilizer airfoil shape (FIG. 2B)

| Point | X Coordinates | Y Coordinates | | Camber | Thickness |
| --- | --- | --- | --- | --- | --- |
| | | Upper Surface | Lower Surface | | |
| 142 | 0.995756 | 0.0002505 | −0.0025745 | −0.001162 | 0.002825 |
| 143 | 0.997224 | 0.000652 | −0.002172 | −0.00076 | 0.002824 |
| 144 | 0.998638 | 0.001039 | −0.001785 | −0.000373 | 0.002824 |
| 145 | 1 | 0.001412 | −0.001412 | 0 | 0.002824 |

FIG. 2C illustrates a two-dimensional view of an example embodiment of horizontal stabilizer 200. In the illustrated embodiment, horizontal stabilizer 200 has a rectangular shape with four sides that include a leading edge 202, trailing edge 204, right outboard end 210a, and left outboard end 210b. In some embodiments, horizontal stabilizer 200 may be implemented using the following design parameters: a chord of 23.5 inches, span of 140.98 inches, total area of 23 square feet, maximum thickness of 12% (measured as a percentage of chord length), and angle of incidence in the range of 0.0 degrees to −2.0 degrees to achieve a level cabin during cruise. In various embodiments, for example, the angle of incidence could be −0.5 degrees, −0.75 degrees, or −1.0 degrees. Moreover, in some embodiments, horizontal stabilizer 200 may be positioned on a rotorcraft based on the following waterline (WL), butt line (BL), and fuselage station (FS) locations: BL ranging from 0.0 inches (at the middle of the horizontal stabilizer) to +−70.49 inches (at the left and right outboard ends of the horizontal stabilizer), and a mean aerodynamic center (MAC) at FS 658.98 inches, BL 0.0 inches, and WL 68.98 inches. The butt line (BL) refers to the lateral alignment relative to the center of a rotorcraft, the fuselage station (FS) refers to the alignment along the length of the rotorcraft (e.g., from the nose or another reference point near the forward end of the rotorcraft), and the waterline (WL) refers to the height from the ground or another reference point below the rotorcraft. The described embodiment of horizontal stabilizer 200 can result in a stall margin of approximately 39% in level flight (approximately 61% of the max lift coefficient) and no stall margin in max climb. The described embodiment also provides an acceptable pitch attitude during autorotation descent and is designed to stall during steep autorotation (e.g., to avoid producing an upthrust and an undesirable nose-down pitching moment on the fuselage).

The various design and configuration parameters described for horizontal stabilizer 200 are merely examples associated with a particular embodiment. In other embodiments and/or aircraft, horizontal stabilizer 200 may be implemented using varying design and configuration parameters.

FIGS. 3A-B illustrate performance graphs for an example embodiment of the horizontal stabilizer of FIGS. 2A-C. The graph of FIG. 3A plots 303 the lift coefficient 301 of the horizontal stabilizer at varying angles of attack 302. In the illustrated graph, as the angle of attack increases, the lift coefficient generally increases and thus more lift is generated, until reaching an angle of attack that causes the horizontal stabilizer to stall. The graph of FIG. 3B plots 313 the drag coefficient 311 of the horizontal stabilizer at varying angles of attack 312. As reflected by the graphs of FIGS. 3A and 3B, the design of the horizontal stabilizer of FIGS. 2A-C results in favorable lift coefficients (e.g., increasing the amount of lift produced at a given angle of attack), favorable stall characteristics (e.g., enabling ascent at higher angles of attack without stalling, thus resulting in faster ascent), and a favorable overall lift-to-drag ratio.

FIG. 4 illustrates an example embodiment of a slatted horizontal stabilizer 400. The slatted horizontal stabilizer 400 includes a primary airfoil 410 and one or more adjustable slats 411 near the leading edge. The adjustable slats 411 may be used to produce certain airflow characteristics at varying angles of attack, for example, to increase the amount of lift produced by the horizontal stabilizer. The use of adjustable slats 411, however, increases the complexity of a horizontal stabilizer, and may also require an aircraft to provide anti-icing capabilities for the adjustable slats. By contrast, the horizontal stabilizer 200 of FIGS. 2A-C is designed to achieve the performance benefits of a slatted design without using slats, thus eliminating the need for both the slats themselves and for any associated anti-icing capabilities, which reduces the complexity, weight, and cost of the stabilizer while improving the overall performance of the aircraft. Compared to the slatted horizontal stabilizer 400 of FIG. 4, for example, the horizontal stabilizer 200 of FIGS. 2A-C has more camber, a top surface that has a concave slope rather than being flat, and no slats.

Figure 5B:
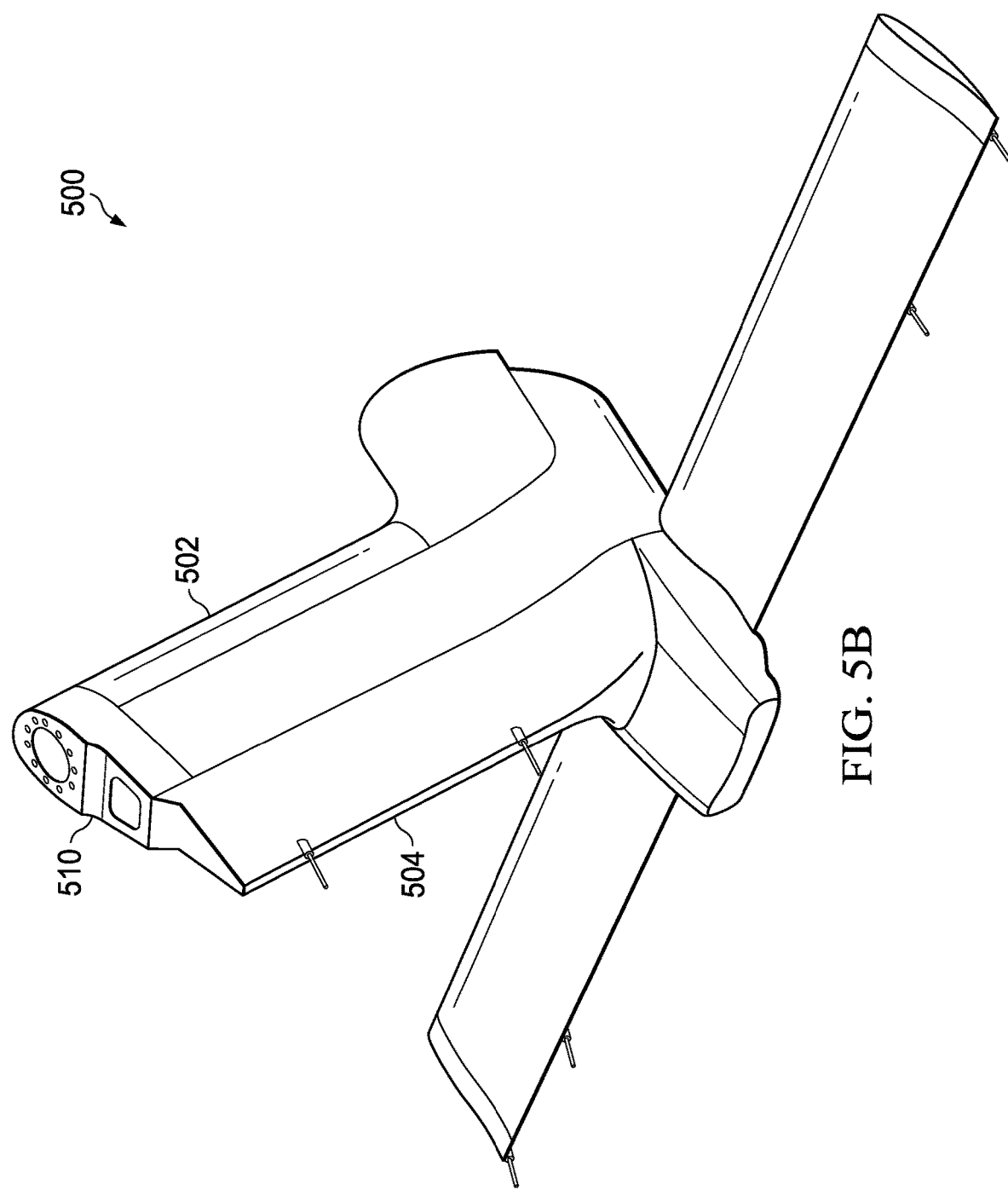
Figure 5D:
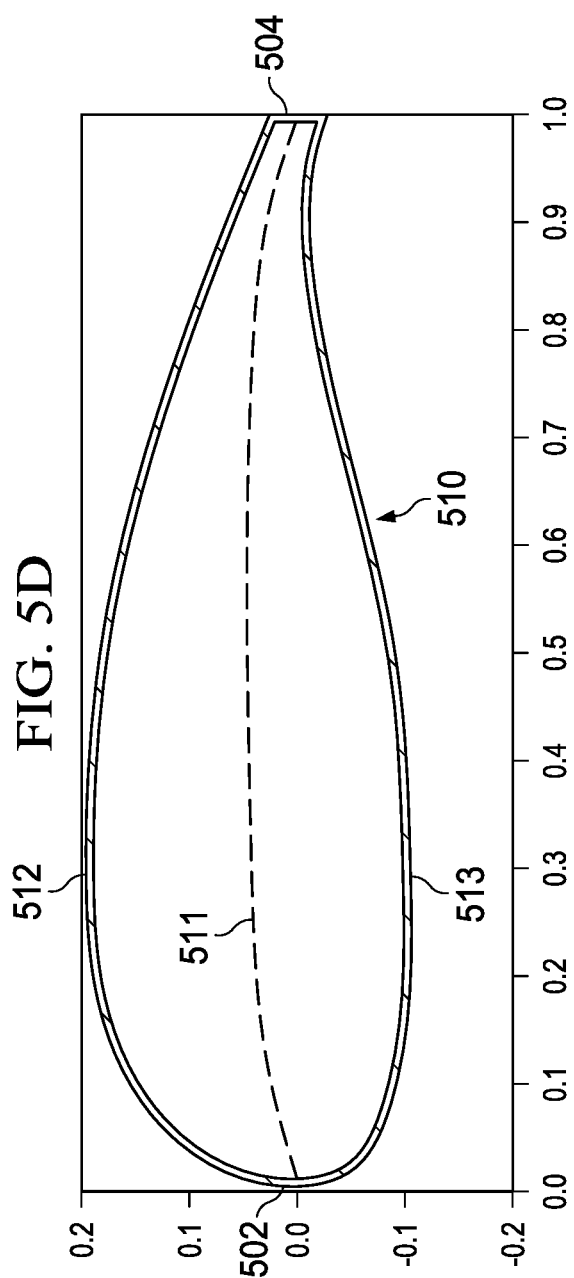
Figure 5E:
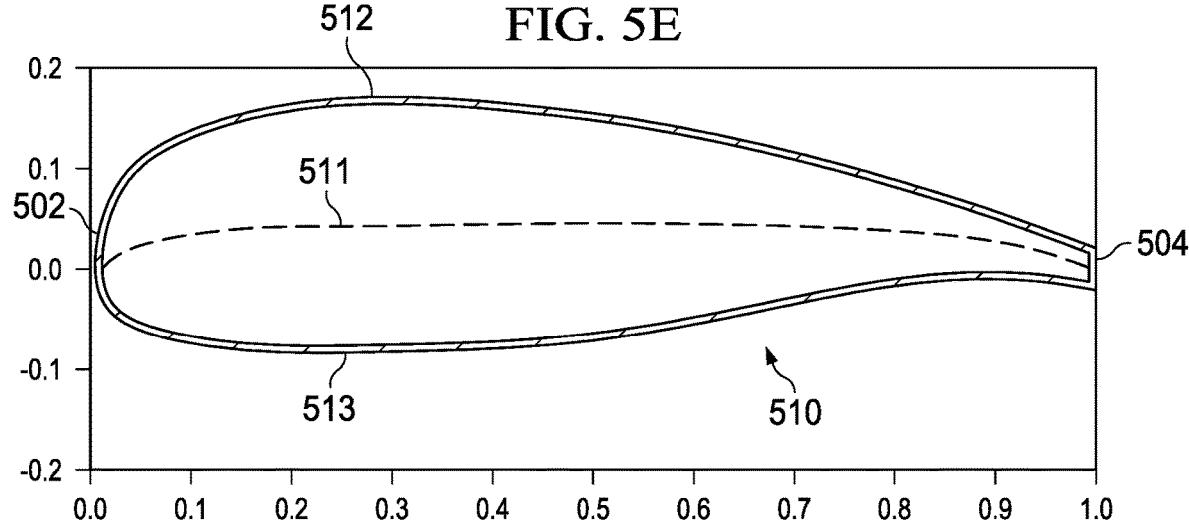
Figure 5F:
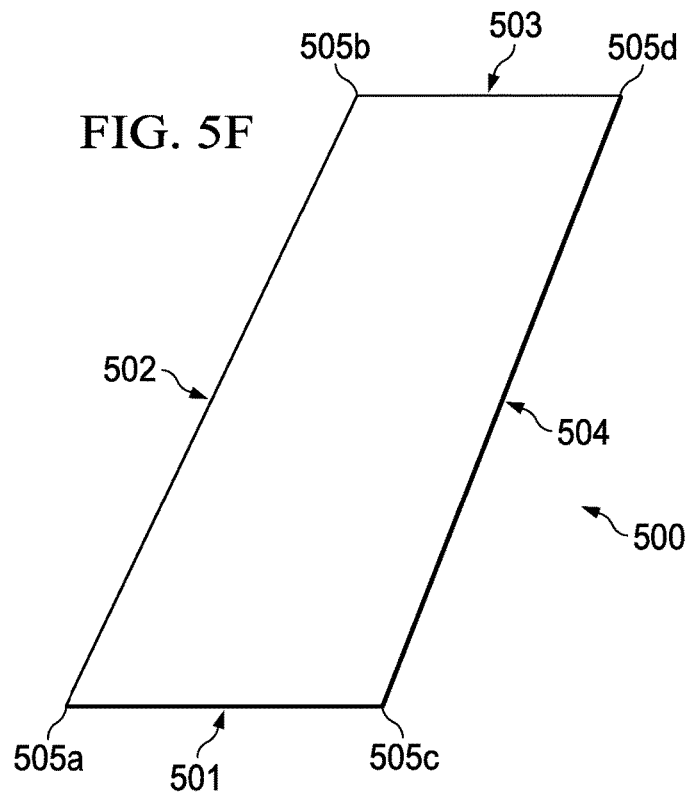

FIGS. 5A-F illustrate an example embodiment of a vertical stabilizer 500. As described further below, FIGS. 5A-C illustrate three-dimensional views of the vertical stabilizer, FIGS. 5D-E illustrate the airfoil shape of the vertical stabilizer, and FIG. 5F illustrates a two-dimensional view of the vertical stabilizer. In some embodiments, the design of vertical stabilizer 500 (or a similar variation) can also be used for other fairings, including gear sponsons, sail fairings, spinners, and so forth.

FIGS. 5A, 5B, and 5C illustrate three-dimensional views of vertical stabilizer 500. In the illustrated embodiment, vertical stabilizer 500 is mounted on the aft end of a rotorcraft, and includes a leading edge 502 and a trailing edge 504. Vertical stabilizer 500 is also tapered, and thus gradually decreases in size from bottom to top. Moreover, in some embodiments, vertical stabilizer 500 may be a fixed structure with no adjustable control surfaces. Vertical stabilizer 500 is designed to provide strong aerodynamic performance, while also serving as a structural mount for a high tail rotor and as the housing for certain internal components (e.g., the tail rotor driveshaft and other tail rotor components, spar structures, hydraulic systems, cooling systems, and so forth). For example, the design of vertical stabilizer 500 enables a tail rotor to be mounted near the top of the stabilizer (e.g., high enough to provide head clearance) and also enables the tail rotor to be positioned in the tip-path-plane (TPP) of the main rotor (e.g., to minimize left wheel down roll coupling in hover). The design of vertical stabilizer 500 also enables transportability (e.g., in a C5 transport) without disassembling the tail boom or the vertical stabilizer. Accordingly, vertical stabilizer 500 uses a tailored airfoil shape 510 that satisfies various design criteria, including strong aerodynamic performance (e.g., yaw or directional stability and control, anti-torque control, minimal flow separation and drag), dimensions large enough to house various components internally and provide a mount for the tail rotor, easy maintenance access (e.g., in the event of a bird strike), and reduced manufacturing complexity.

FIGS. 5D and 5E illustrate the airfoil shape 510 of vertical stabilizer 500. As noted above, vertical stabilizer 500 is tapered and thus its size and shape varies slightly from top to bottom. Accordingly, the airfoil shape of vertical stabilizer 500 near the top is illustrated in FIG. 5D, and the airfoil shape of vertical stabilizer 500 near the bottom is illustrated in FIG. 5E.

As shown in FIGS. 5D and 5E, the airfoil shape 510 of vertical stabilizer 500 includes a leading edge 502 and trailing edge 504, and a right side 512 and left side 513. In the illustrated embodiment, the trailing edge 504 is blunt rather than pointed. The airfoil shape 510 of vertical stabilizer 500 is also cambered, and the mean camber line 511 for the top and bottom portion is respectively shown in FIGS. 5D and 5E (e.g., the line drawn halfway between the right side 512 and left side 513 of the airfoil). In some embodiments, for example, the camber of the airfoil shape 510 forms a convex slope on the right side 512, and both a convex slope and a concave slope on the left side 513. The airfoil shape 510 of vertical stabilizer 500 provides yaw stability and anti-torque control while also minimizing flow separation and drag. For example, the camber of airfoil shape 510 produces a portion of the anti-torque required for stability in forward flight (e.g., approximately half the requisite anti-torque in some cases), thus reducing the anti-torque requirements and power consumption of the tail rotor. The resulting anti-torque may also be sufficient to allow continued flight in the event of a tail rotor failure. The camber of airfoil shape 510 can also produce sufficient aerodynamic side-force to offset the tail rotor thrust in forward flight, thus minimizing tail rotor flapping and cyclic loads and maximizing the fatigue life of components. Moreover, the trailing edge 504 of the airfoil shape 510 is blunt rather than pointed in order to reduce the thickness tapering on the aft end without modifying the desired chord length, thus minimizing flow separation and drag while also reducing manufacturing complexity (as described further in connection with FIG. 7).

Example design parameters (e.g., coordinates, camber, and thickness) for the vertical stabilizer top airfoil shape of FIG. 5D are provided in TABLE 2, and example design parameters for the vertical stabilizer bottom airfoil shape of FIG. 5E are provided in TABLE 3.

TABLE 2

Design parameters for vertical stabilizer top airfoil shape (FIG. 5D)

| Point | X Coordinates | Y Coordinates Upper Surface | Y Coordinates Lower Surface | Camber | Thickness |
|---|---|---|---|---|---|
| 1 | 0 | 0 | 0 | 0.007819 | 0 |
| 2 | 0.001148 | 0.02621 | −0.013294 | 0.006458 | 0.039504 |
| 3 | 0.002367 | 0.034617 | −0.019189 | 0.007714 | 0.053806 |
| 4 | 0.003471 | 0.0403845 | −0.0231005 | 0.008642 | 0.063485 |
| 5 | 0.004836 | 0.0462755 | −0.0270995 | 0.009588 | 0.073375 |
| 6 | 0.006483 | 0.052279 | −0.031041 | 0.010619 | 0.08332 |
| 7 | 0.008432 | 0.0583855 | −0.0350475 | 0.011669 | 0.093433 |
| 8 | 0.00953 | 0.0614715 | −0.0370355 | 0.012218 | 0.098507 |
| 9 | 0.010711 | 0.0645785 | −0.0390425 | 0.012768 | 0.103621 |
| 10 | 0.011979 | 0.0677035 | −0.0410595 | 0.013322 | 0.108763 |
| 11 | 0.013337 | 0.070844 | −0.04298 | 0.013932 | 0.113824 |
| 12 | 0.01479 | 0.073998 | −0.044914 | 0.014542 | 0.118912 |
| 13 | 0.016336 | 0.077164 | −0.046878 | 0.015143 | 0.124042 |
| 14 | 0.017981 | 0.080338 | −0.048884 | 0.015727 | 0.129222 |
| 15 | 0.019726 | 0.083518 | −0.050904 | 0.016307 | 0.134422 |
| 16 | 0.021573 | 0.0867025 | −0.0529225 | 0.01689 | 0.139625 |
| 17 | 0.023526 | 0.089886 | −0.054888 | 0.017499 | 0.144774 |
| 18 | 0.025582 | 0.093068 | −0.056808 | 0.01813 | 0.149876 |
| 19 | 0.027748 | 0.096245 | −0.058713 | 0.018766 | 0.154958 |
| 20 | 0.030025 | 0.0994135 | −0.0605915 | 0.019411 | 0.160005 |
| 21 | 0.032412 | 0.102572 | −0.062428 | 0.020072 | 0.165 |
| 22 | 0.034911 | 0.105717 | −0.064241 | 0.020738 | 0.169958 |
| 23 | 0.037525 | 0.108844 | −0.06603 | 0.021407 | 0.174874 |
| 24 | 0.040254 | 0.1119525 | −0.0677885 | 0.022082 | 0.179741 |
| 25 | 0.043098 | 0.1150385 | −0.0695165 | 0.022761 | 0.184555 |

TABLE 2-continued

Design parameters for vertical stabilizer top airfoil shape (FIG. 5D)

| Point | X Coordinates | Y Coordinates Upper Surface | Y Coordinates Lower Surface | Camber | Thickness |
|---|---|---|---|---|---|
| 26 | 0.046058 | 0.1180985 | −0.0712105 | 0.023444 | 0.189309 |
| 27 | 0.049135 | 0.1211315 | −0.0728675 | 0.024132 | 0.193999 |
| 28 | 0.05233 | 0.124133 | −0.074485 | 0.024824 | 0.198618 |
| 29 | 0.055644 | 0.1271015 | −0.0760555 | 0.025523 | 0.203157 |
| 30 | 0.059075 | 0.130034 | −0.077584 | 0.026225 | 0.207618 |
| 31 | 0.062622 | 0.1329305 | −0.0790705 | 0.02693 | 0.212001 |
| 32 | 0.06629 | 0.1357855 | −0.0805135 | 0.027636 | 0.216299 |
| 33 | 0.070075 | 0.1385965 | −0.0819125 | 0.028342 | 0.220509 |
| 34 | 0.073978 | 0.1413635 | −0.0832635 | 0.02905 | 0.224627 |
| 35 | 0.077999 | 0.1440835 | −0.0845695 | 0.029757 | 0.228653 |
| 36 | 0.082138 | 0.1467565 | −0.0858285 | 0.030464 | 0.232585 |
| 37 | 0.086394 | 0.1493765 | −0.0870405 | 0.031168 | 0.236417 |
| 38 | 0.090767 | 0.1519455 | −0.0882035 | 0.031871 | 0.240149 |
| 39 | 0.095257 | 0.1544605 | −0.0893205 | 0.03257 | 0.243781 |
| 40 | 0.099863 | 0.15692 | −0.09039 | 0.033265 | 0.24731 |
| 41 | 0.104585 | 0.159322 | −0.091416 | 0.033953 | 0.250738 |
| 42 | 0.109424 | 0.1616655 | −0.0923975 | 0.034634 | 0.254063 |
| 43 | 0.114378 | 0.1639495 | −0.0933335 | 0.035308 | 0.257283 |
| 44 | 0.119447 | 0.1661725 | −0.0942265 | 0.035973 | 0.260399 |
| 45 | 0.124631 | 0.1683315 | −0.0950755 | 0.036628 | 0.263407 |
| 46 | 0.12993 | 0.170428 | −0.095884 | 0.037272 | 0.266312 |
| 47 | 0.135344 | 0.172459 | −0.096653 | 0.037903 | 0.269112 |
| 48 | 0.140873 | 0.1744245 | −0.0973825 | 0.038521 | 0.271807 |
| 49 | 0.146515 | 0.176322 | −0.098074 | 0.039124 | 0.274396 |
| 50 | 0.152272 | 0.1781525 | −0.0987245 | 0.039714 | 0.276877 |
| 51 | 0.158144 | 0.1799125 | −0.0993345 | 0.040289 | 0.279247 |
| 52 | 0.16413 | 0.1816015 | −0.0999035 | 0.040849 | 0.281505 |
| 53 | 0.170229 | 0.183219 | −0.100433 | 0.041393 | 0.283652 |
| 54 | 0.176443 | 0.184765 | −0.100923 | 0.041921 | 0.285688 |
| 55 | 0.182772 | 0.1862365 | −0.1013685 | 0.042434 | 0.287605 |
| 56 | 0.189215 | 0.1876325 | −0.1017745 | 0.042929 | 0.289407 |
| 57 | 0.195773 | 0.1889535 | −0.1021435 | 0.043405 | 0.291097 |
| 58 | 0.202446 | 0.1901965 | −0.1024745 | 0.043861 | 0.292671 |
| 59 | 0.209234 | 0.191361 | −0.102767 | 0.044297 | 0.294128 |
| 60 | 0.216137 | 0.1924475 | −0.1030235 | 0.044712 | 0.295471 |
| 61 | 0.223157 | 0.1934515 | −0.1032435 | 0.045104 | 0.296695 |
| 62 | 0.230292 | 0.1943765 | −0.1034285 | 0.045474 | 0.297805 |
| 63 | 0.237545 | 0.1952165 | −0.1035745 | 0.045821 | 0.298791 |
| 64 | 0.244914 | 0.1959725 | −0.1036865 | 0.046143 | 0.299659 |
| 65 | 0.2524 | 0.196645 | −0.103761 | 0.046442 | 0.300406 |
| 66 | 0.260005 | 0.1972275 | −0.1038015 | 0.046713 | 0.301029 |
| 67 | 0.267728 | 0.1977225 | −0.1038065 | 0.046958 | 0.301529 |
| 68 | 0.27557 | 0.198128 | −0.103776 | 0.047176 | 0.301904 |
| 69 | 0.283532 | 0.198443 | −0.103709 | 0.047367 | 0.302152 |
| 70 | 0.291613 | 0.1986665 | −0.1036045 | 0.047531 | 0.302271 |
| 71 | 0.299816 | 0.198793 | −0.103461 | 0.047666 | 0.302254 |
| 72 | 0.308139 | 0.1988245 | −0.1032765 | 0.047774 | 0.302101 |
| 73 | 0.316585 | 0.198759 | −0.103051 | 0.047854 | 0.30181 |
| 74 | 0.325153 | 0.198594 | −0.102784 | 0.047905 | 0.301378 |
| 75 | 0.333845 | 0.1983275 | −0.1024715 | 0.047928 | 0.300799 |
| 76 | 0.342661 | 0.197959 | −0.102113 | 0.047923 | 0.300072 |
| 77 | 0.351601 | 0.1974845 | −0.1017065 | 0.047889 | 0.299191 |
| 78 | 0.360667 | 0.1969025 | −0.1012485 | 0.047827 | 0.298151 |
| 79 | 0.369858 | 0.1962135 | −0.1007335 | 0.04774 | 0.296947 |
| 80 | 0.379178 | 0.195427 | −0.100159 | 0.047634 | 0.295586 |
| 81 | 0.388632 | 0.1945975 | −0.0995255 | 0.047536 | 0.294123 |
| 82 | 0.398222 | 0.1937265 | −0.0988265 | 0.04745 | 0.292553 |
| 83 | 0.40795 | 0.1928095 | −0.0980635 | 0.047373 | 0.290873 |
| 84 | 0.417817 | 0.1918455 | −0.0972295 | 0.047308 | 0.289075 |
| 85 | 0.427825 | 0.190828 | −0.096322 | 0.047253 | 0.28715 |
| 86 | 0.437976 | 0.189755 | −0.095337 | 0.047209 | 0.285092 |
| 87 | 0.448271 | 0.1886215 | −0.0942655 | 0.047178 | 0.282887 |
| 88 | 0.458712 | 0.187421 | −0.093101 | 0.04716 | 0.280522 |
| 89 | 0.469146 | 0.1861685 | −0.0918585 | 0.047155 | 0.278027 |
| 90 | 0.479428 | 0.184881 | −0.090553 | 0.047164 | 0.275434 |
| 91 | 0.489559 | 0.1835555 | −0.0891855 | 0.047185 | 0.272741 |
| 92 | 0.49954 | 0.1821925 | −0.0877565 | 0.047218 | 0.269949 |
| 93 | 0.509373 | 0.1807925 | −0.0862645 | 0.047264 | 0.267057 |
| 94 | 0.519061 | 0.1793545 | −0.0847125 | 0.047321 | 0.264067 |
| 95 | 0.528603 | 0.1778755 | −0.0831015 | 0.047387 | 0.260977 |
| 96 | 0.538003 | 0.1763615 | −0.0814315 | 0.047465 | 0.257793 |
| 97 | 0.547262 | 0.174809 | −0.079705 | 0.047552 | 0.254514 |
| 98 | 0.55638 | 0.1732185 | −0.0779265 | 0.047646 | 0.251145 |

TABLE 2-continued

Design parameters for vertical stabilizer top airfoil shape (FIG. 5D)

| Point | X Coordinates | Y Coordinates Upper Surface | Y Coordinates Lower Surface | Camber | Thickness |
|---|---|---|---|---|---|
| 99 | 0.56536 | 0.171591 | −0.076099 | 0.047746 | 0.24769 |
| 100 | 0.574204 | 0.169928 | −0.074224 | 0.047852 | 0.244152 |
| 101 | 0.582912 | 0.16823 | −0.072308 | 0.047961 | 0.240538 |
| 102 | 0.591487 | 0.1664985 | −0.0703505 | 0.048074 | 0.236849 |
| 103 | 0.599931 | 0.1647345 | −0.0683625 | 0.048186 | 0.233097 |
| 104 | 0.608244 | 0.162939 | −0.066353 | 0.048293 | 0.229292 |
| 105 | 0.616429 | 0.161114 | −0.064328 | 0.048393 | 0.225442 |
| 106 | 0.624487 | 0.1592625 | −0.0622965 | 0.048483 | 0.221559 |
| 107 | 0.63242 | 0.1573845 | −0.0602665 | 0.048559 | 0.217651 |
| 108 | 0.64023 | 0.1554835 | −0.0582435 | 0.04862 | 0.213727 |
| 109 | 0.647919 | 0.1535615 | −0.0562315 | 0.048665 | 0.209793 |
| 110 | 0.655488 | 0.1516185 | −0.0542345 | 0.048692 | 0.205853 |
| 111 | 0.66294 | 0.1496595 | −0.0522575 | 0.048701 | 0.201917 |
| 112 | 0.670276 | 0.147683 | −0.050303 | 0.04869 | 0.197986 |
| 113 | 0.677497 | 0.145695 | −0.048373 | 0.048661 | 0.194068 |
| 114 | 0.684607 | 0.143695 | −0.046473 | 0.048611 | 0.190168 |
| 115 | 0.691607 | 0.1416855 | −0.0446035 | 0.048541 | 0.186289 |
| 116 | 0.698498 | 0.1396685 | −0.0427685 | 0.04845 | 0.182437 |
| 117 | 0.705282 | 0.1376455 | −0.0409715 | 0.048337 | 0.178617 |
| 118 | 0.711963 | 0.1356205 | −0.0392145 | 0.048203 | 0.174835 |
| 119 | 0.718539 | 0.1335915 | −0.0374995 | 0.048046 | 0.171091 |
| 120 | 0.725016 | 0.1315635 | −0.0358335 | 0.047865 | 0.167397 |
| 121 | 0.731392 | 0.1295355 | −0.0342135 | 0.047661 | 0.163749 |
| 122 | 0.737671 | 0.1275115 | −0.0326475 | 0.047432 | 0.160159 |
| 123 | 0.743855 | 0.125491 | −0.031135 | 0.047178 | 0.156626 |
| 124 | 0.749943 | 0.123476 | −0.02968 | 0.046898 | 0.153156 |
| 125 | 0.75594 | 0.1214655 | −0.0282875 | 0.046589 | 0.149753 |
| 126 | 0.761846 | 0.1194655 | −0.0269575 | 0.046254 | 0.146423 |
| 127 | 0.767662 | 0.117473 | −0.025693 | 0.04589 | 0.143166 |
| 128 | 0.77339 | 0.11549 | −0.024492 | 0.045499 | 0.139982 |
| 129 | 0.779032 | 0.113518 | −0.023354 | 0.045082 | 0.136872 |
| 130 | 0.78459 | 0.111558 | −0.022278 | 0.04464 | 0.133836 |
| 131 | 0.790065 | 0.1096105 | −0.0212625 | 0.044174 | 0.130873 |
| 132 | 0.795457 | 0.1076745 | −0.0203065 | 0.043684 | 0.127981 |
| 133 | 0.800769 | 0.105753 | −0.019407 | 0.043173 | 0.12516 |
| 134 | 0.806003 | 0.1038455 | −0.0185655 | 0.04264 | 0.122411 |
| 135 | 0.811158 | 0.1019515 | −0.0177775 | 0.042087 | 0.119729 |
| 136 | 0.816237 | 0.1000755 | −0.0170415 | 0.041517 | 0.117117 |
| 137 | 0.82124 | 0.0982125 | −0.0163565 | 0.040928 | 0.114569 |
| 138 | 0.826171 | 0.0963675 | −0.0157215 | 0.040323 | 0.112089 |
| 139 | 0.831028 | 0.094537 | −0.015135 | 0.039701 | 0.109672 |
| 140 | 0.835814 | 0.0927235 | −0.0145935 | 0.039065 | 0.107317 |
| 141 | 0.84054 | 0.090929 | −0.014097 | 0.038416 | 0.105026 |
| 142 | 0.845176 | 0.0891485 | −0.0136425 | 0.037753 | 0.102791 |
| 143 | 0.849755 | 0.0873875 | −0.0132295 | 0.037079 | 0.100617 |
| 144 | 0.854266 | 0.085644 | −0.012856 | 0.036394 | 0.0985 |
| 145 | 0.858712 | 0.083918 | −0.01252 | 0.035699 | 0.096438 |
| 146 | 0.863093 | 0.0822095 | −0.0122215 | 0.034994 | 0.094431 |
| 147 | 0.86741 | 0.0805185 | −0.0119565 | 0.034281 | 0.092475 |
| 148 | 0.871665 | 0.078846 | −0.011726 | 0.03356 | 0.090572 |
| 149 | 0.875858 | 0.0771915 | −0.0115295 | 0.032831 | 0.088721 |
| 150 | 0.87999 | 0.075554 | −0.01136 | 0.032097 | 0.086914 |
| 151 | 0.884062 | 0.073936 | −0.011214 | 0.031361 | 0.08515 |
| 152 | 0.888076 | 0.072335 | −0.011105 | 0.030615 | 0.08344 |
| 153 | 0.892031 | 0.070753 | −0.011035 | 0.029859 | 0.081788 |
| 154 | 0.89593 | 0.0691895 | −0.0109835 | 0.029103 | 0.080173 |
| 155 | 0.899771 | 0.067642 | −0.01095 | 0.028346 | 0.078592 |
| 156 | 0.903558 | 0.0661125 | −0.0109465 | 0.027583 | 0.077059 |
| 157 | 0.90729 | 0.0646025 | −0.0109805 | 0.026811 | 0.075583 |
| 158 | 0.910969 | 0.06311 | −0.011058 | 0.026026 | 0.074168 |
| 159 | 0.914595 | 0.061635 | −0.011169 | 0.025233 | 0.072804 |
| 160 | 0.918169 | 0.060178 | −0.011306 | 0.024436 | 0.071484 |
| 161 | 0.921691 | 0.0587375 | −0.0114635 | 0.023637 | 0.070201 |
| 162 | 0.925163 | 0.057315 | −0.011635 | 0.02284 | 0.06895 |
| 163 | 0.928585 | 0.0559095 | −0.0118155 | 0.022047 | 0.067725 |
| 164 | 0.931959 | 0.0545215 | −0.0119975 | 0.021262 | 0.066519 |
| 165 | 0.935283 | 0.0531495 | −0.0122075 | 0.020471 | 0.065357 |
| 166 | 0.938561 | 0.0517955 | −0.0124715 | 0.019662 | 0.064267 |
| 167 | 0.941792 | 0.050459 | −0.012753 | 0.018853 | 0.063212 |
| 168 | 0.944977 | 0.0491375 | −0.0130575 | 0.01804 | 0.062195 |
| 169 | 0.948116 | 0.0478335 | −0.0133835 | 0.017225 | 0.061217 |
| 170 | 0.95121 | 0.0465465 | −0.0137365 | 0.016405 | 0.060283 |
| 171 | 0.954261 | 0.0452735 | −0.0141155 | 0.015579 | 0.059389 |
| 172 | 0.957268 | 0.0440185 | −0.0145225 | 0.014748 | 0.058541 |
| 173 | 0.960231 | 0.042779 | −0.014959 | 0.01391 | 0.057738 |
| 174 | 0.963154 | 0.041556 | −0.015428 | 0.013064 | 0.056984 |
| 175 | 0.966034 | 0.040347 | −0.015929 | 0.012209 | 0.056276 |
| 176 | 0.968873 | 0.039155 | −0.016463 | 0.011346 | 0.055618 |
| 177 | 0.971673 | 0.037979 | −0.017033 | 0.010473 | 0.055012 |
| 178 | 0.974432 | 0.036817 | −0.017639 | 0.009589 | 0.054456 |
| 179 | 0.977152 | 0.03567 | −0.018284 | 0.008693 | 0.053954 |
| 180 | 0.979833 | 0.034536 | −0.01897 | 0.007783 | 0.053506 |
| 181 | 0.982477 | 0.0334195 | −0.0196955 | 0.006862 | 0.053115 |
| 182 | 0.985083 | 0.032318 | −0.020462 | 0.005928 | 0.05278 |
| 183 | 0.987652 | 0.0312295 | −0.0212715 | 0.004979 | 0.052501 |
| 184 | 0.990184 | 0.030154 | −0.022126 | 0.004014 | 0.05228 |
| 185 | 0.992681 | 0.0290955 | −0.0230215 | 0.003037 | 0.052117 |
| 186 | 0.995142 | 0.028048 | −0.023964 | 0.002042 | 0.052012 |
| 187 | 0.997569 | 0.027016 | −0.024954 | 0.001031 | 0.05197 |
| 188 | 0.999961 | 0.0259985 | −0.0259885 | 0.000005 | 0.051987 |

TABLE 3

Design parameters for vertical stabilizer bottom airfoil shape (FIG. 5E)

| Point | X Coordinates | Y Coordinates Upper Surface | Y Coordinates Lower Surface | Camber | Thickness |
|---|---|---|---|---|---|
| 1 | 0 | 0 | 0 | 0 | 0 |
| 2 | 0.001237 | 0.020048 | −0.012138 | 0.003955 | 0.032186 |
| 3 | 0.00236 | 0.027398 | −0.016252 | 0.005573 | 0.04365 |
| 4 | 0.003366 | 0.032477 | −0.019109 | 0.006684 | 0.051586 |
| 5 | 0.004607 | 0.0376945 | −0.0220405 | 0.007827 | 0.059735 |
| 6 | 0.006108 | 0.043042 | −0.024986 | 0.009028 | 0.068028 |
| 7 | 0.007898 | 0.0485085 | −0.0280185 | 0.010245 | 0.076527 |
| 8 | 0.008909 | 0.0512825 | −0.0295285 | 0.010877 | 0.080811 |
| 9 | 0.010003 | 0.0540815 | −0.0310615 | 0.01151 | 0.085143 |
| 10 | 0.011181 | 0.056903 | −0.032607 | 0.012148 | 0.08951 |
| 11 | 0.012451 | 0.059745 | −0.034129 | 0.012808 | 0.093874 |
| 12 | 0.013811 | 0.062604 | −0.035656 | 0.013474 | 0.09826 |
| 13 | 0.01527 | 0.0654785 | −0.0371925 | 0.014143 | 0.102671 |
| 14 | 0.016827 | 0.068365 | −0.038733 | 0.014816 | 0.107098 |
| 15 | 0.018487 | 0.071261 | −0.040257 | 0.015502 | 0.111518 |
| 16 | 0.020252 | 0.0741635 | −0.0417655 | 0.016199 | 0.115929 |
| 17 | 0.022126 | 0.0770685 | −0.0432705 | 0.016899 | 0.120339 |
| 18 | 0.024111 | 0.079973 | −0.044767 | 0.017603 | 0.12474 |
| 19 | 0.02621 | 0.0828735 | −0.0462535 | 0.01831 | 0.129127 |
| 20 | 0.028425 | 0.085766 | −0.047726 | 0.01902 | 0.133492 |
| 21 | 0.030757 | 0.0886485 | −0.0491785 | 0.019735 | 0.137827 |
| 22 | 0.033209 | 0.091517 | −0.050609 | 0.020454 | 0.142126 |
| 23 | 0.035782 | 0.0943665 | −0.0520085 | 0.021179 | 0.146375 |
| 24 | 0.038479 | 0.0971955 | −0.0533895 | 0.021903 | 0.150585 |
| 25 | 0.041299 | 0.1 | −0.05475 | 0.022625 | 0.15475 |
| 26 | 0.044244 | 0.102776 | −0.056088 | 0.023344 | 0.158864 |
| 27 | 0.047314 | 0.1055215 | −0.0574015 | 0.02406 | 0.162923 |
| 28 | 0.050512 | 0.1082315 | −0.0586875 | 0.024772 | 0.166919 |
| 29 | 0.053835 | 0.1109055 | −0.0599435 | 0.025481 | 0.170849 |
| 30 | 0.057286 | 0.11354 | −0.061168 | 0.026186 | 0.174708 |
| 31 | 0.060864 | 0.116131 | −0.062361 | 0.026885 | 0.178492 |
| 32 | 0.064568 | 0.118678 | −0.063516 | 0.027581 | 0.182194 |
| 33 | 0.0684 | 0.121177 | −0.064637 | 0.02827 | 0.185814 |
| 34 | 0.072359 | 0.123629 | −0.065723 | 0.028953 | 0.189352 |
| 35 | 0.076445 | 0.126029 | −0.066775 | 0.029627 | 0.192804 |
| 36 | 0.080658 | 0.1283745 | −0.0677925 | 0.030291 | 0.196167 |
| 37 | 0.084996 | 0.130667 | −0.068775 | 0.030946 | 0.199442 |
| 38 | 0.089462 | 0.1329035 | −0.0697235 | 0.03159 | 0.202627 |
| 39 | 0.094054 | 0.135082 | −0.070638 | 0.032222 | 0.20572 |
| 40 | 0.098772 | 0.137201 | −0.071519 | 0.032841 | 0.20872 |
| 41 | 0.103616 | 0.1392615 | −0.0723615 | 0.03345 | 0.211623 |
| 42 | 0.108586 | 0.14126 | −0.07317 | 0.034045 | 0.21443 |
| 43 | 0.113681 | 0.1431955 | −0.0739455 | 0.034625 | 0.217141 |

TABLE 3-continued

Design parameters for vertical stabilizer bottom airfoil shape (FIG. 5E)

| | | Y Coordinates | | | |
| | | Upper | Lower | | |
| Point | X Coordinates | Surface | Surface | Camber | Thickness |
| --- | --- | --- | --- | --- | --- |
| 44 | 0.118903 | 0.1450695 | −0.0746875 | 0.035191 | 0.219757 |
| 45 | 0.124251 | 0.146878 | −0.075398 | 0.03574 | 0.222276 |
| 46 | 0.129725 | 0.1486235 | −0.0760735 | 0.036275 | 0.224697 |
| 47 | 0.135326 | 0.1503015 | −0.0767135 | 0.036794 | 0.227015 |
| 48 | 0.141054 | 0.151914 | −0.077316 | 0.037299 | 0.22923 |
| 49 | 0.146909 | 0.1534595 | −0.0778835 | 0.037788 | 0.231343 |
| 50 | 0.152892 | 0.1549355 | −0.0784175 | 0.038259 | 0.233353 |
| 51 | 0.159003 | 0.1563455 | −0.0789155 | 0.038715 | 0.235261 |
| 52 | 0.165243 | 0.1576835 | −0.0793795 | 0.039152 | 0.237063 |
| 53 | 0.171613 | 0.158953 | −0.079801 | 0.039576 | 0.238754 |
| 54 | 0.178113 | 0.1601515 | −0.0801915 | 0.03998 | 0.240343 |
| 55 | 0.184745 | 0.161278 | −0.080548 | 0.040365 | 0.241826 |
| 56 | 0.191508 | 0.162333 | −0.080873 | 0.04073 | 0.243206 |
| 57 | 0.198405 | 0.163314 | −0.081168 | 0.041073 | 0.244482 |
| 58 | 0.205437 | 0.1642225 | −0.0814285 | 0.041397 | 0.245651 |
| 59 | 0.212603 | 0.1650555 | −0.0816555 | 0.0417 | 0.246711 |
| 60 | 0.219906 | 0.165813 | −0.081851 | 0.041981 | 0.247664 |
| 61 | 0.227347 | 0.1664955 | −0.0820175 | 0.042239 | 0.248513 |
| 62 | 0.234928 | 0.1671 | −0.082154 | 0.042473 | 0.249254 |
| 63 | 0.242648 | 0.167626 | −0.08226 | 0.042683 | 0.249886 |
| 64 | 0.250511 | 0.168073 | −0.082331 | 0.042871 | 0.250404 |
| 65 | 0.258517 | 0.1684405 | −0.0823745 | 0.043033 | 0.250815 |
| 66 | 0.266668 | 0.1687275 | −0.0823875 | 0.04317 | 0.251115 |
| 67 | 0.274966 | 0.1689315 | −0.0823695 | 0.043281 | 0.251301 |
| 68 | 0.283412 | 0.1690525 | −0.0823225 | 0.043365 | 0.251375 |
| 69 | 0.292008 | 0.169088 | −0.082244 | 0.043422 | 0.251332 |
| 70 | 0.300756 | 0.169039 | −0.082131 | 0.043454 | 0.25117 |
| 71 | 0.309658 | 0.168903 | −0.081985 | 0.043459 | 0.250888 |
| 72 | 0.318716 | 0.1686775 | −0.0818055 | 0.043436 | 0.250483 |
| 73 | 0.32793 | 0.1683635 | −0.0815895 | 0.043387 | 0.249953 |
| 74 | 0.337305 | 0.1679595 | −0.0813375 | 0.043311 | 0.249297 |
| 75 | 0.346842 | 0.167476 | −0.081044 | 0.043216 | 0.24852 |
| 76 | 0.356545 | 0.166941 | −0.080705 | 0.043118 | 0.247646 |
| 77 | 0.366417 | 0.1663515 | −0.0803195 | 0.043016 | 0.246671 |
| 78 | 0.37646 | 0.1657045 | −0.0798845 | 0.04291 | 0.245589 |
| 79 | 0.386678 | 0.164997 | −0.079395 | 0.042801 | 0.244392 |
| 80 | 0.397072 | 0.1642245 | −0.0788485 | 0.042688 | 0.243073 |
| 81 | 0.407647 | 0.1633845 | −0.0782365 | 0.042574 | 0.241621 |
| 82 | 0.418403 | 0.1624735 | −0.0775545 | 0.042461 | 0.240025 |
| 83 | 0.429344 | 0.1614855 | −0.0767875 | 0.042349 | 0.238273 |
| 84 | 0.440473 | 0.1604185 | −0.0759385 | 0.04224 | 0.236357 |
| 85 | 0.451792 | 0.1592665 | −0.0749985 | 0.042134 | 0.234265 |
| 86 | 0.463303 | 0.158027 | −0.073959 | 0.042034 | 0.231986 |
| 87 | 0.474808 | 0.156718 | −0.07283 | 0.041944 | 0.229548 |
| 88 | 0.486106 | 0.155362 | −0.071628 | 0.041867 | 0.22699 |
| 89 | 0.497203 | 0.1539645 | −0.0703505 | 0.041807 | 0.224315 |
| 90 | 0.508102 | 0.152526 | −0.068998 | 0.041764 | 0.221524 |
| 91 | 0.518805 | 0.1510495 | −0.0675735 | 0.041738 | 0.218623 |
| 92 | 0.529316 | 0.1495395 | −0.0660775 | 0.041731 | 0.215617 |
| 93 | 0.539639 | 0.147994 | −0.064522 | 0.041736 | 0.212516 |
| 94 | 0.549776 | 0.1464205 | −0.0629105 | 0.041755 | 0.209331 |
| 95 | 0.55973 | 0.144818 | −0.061254 | 0.041782 | 0.206072 |
| 96 | 0.569505 | 0.1431905 | −0.0595585 | 0.041816 | 0.202749 |
| 97 | 0.579104 | 0.1415395 | −0.0578315 | 0.041854 | 0.199371 |
| 98 | 0.58853 | 0.139867 | −0.056081 | 0.041893 | 0.195948 |
| 99 | 0.597785 | 0.138177 | −0.054315 | 0.041931 | 0.192492 |
| 100 | 0.606873 | 0.1364695 | −0.0525395 | 0.041965 | 0.189009 |
| 101 | 0.615798 | 0.1347475 | −0.0507635 | 0.041992 | 0.185511 |
| 102 | 0.62456 | 0.133012 | −0.048992 | 0.04201 | 0.182004 |
| 103 | 0.633165 | 0.1312655 | −0.0472315 | 0.042017 | 0.178497 |
| 104 | 0.641614 | 0.12951 | −0.045486 | 0.042012 | 0.174996 |
| 105 | 0.64991 | 0.1277465 | −0.0437625 | 0.041992 | 0.171509 |
| 106 | 0.658056 | 0.125977 | −0.042063 | 0.041957 | 0.16804 |
| 107 | 0.666054 | 0.1242065 | −0.0403935 | 0.041905 | 0.164597 |
| 108 | 0.673909 | 0.1224275 | −0.0387555 | 0.041836 | 0.161183 |
| 109 | 0.681621 | 0.120649 | −0.037153 | 0.041748 | 0.157802 |
| 110 | 0.689194 | 0.1188715 | −0.0355855 | 0.041643 | 0.154457 |
| 111 | 0.69663 | 0.1170935 | −0.0340665 | 0.041518 | 0.151151 |
| 112 | 0.703932 | 0.1153195 | −0.0325695 | 0.041375 | 0.147889 |
| 113 | 0.711102 | 0.1135465 | −0.0311225 | 0.041212 | 0.144669 |
| 114 | 0.718142 | 0.111781 | −0.029717 | 0.041032 | 0.141498 |
| 115 | 0.725056 | 0.1100185 | −0.0283565 | 0.040831 | 0.138375 |
| 116 | 0.731845 | 0.1082645 | −0.0270405 | 0.040612 | 0.135305 |
| 117 | 0.738512 | 0.106516 | −0.025772 | 0.040372 | 0.132288 |
| 118 | 0.745058 | 0.1047775 | −0.0245515 | 0.040113 | 0.129329 |
| 119 | 0.751487 | 0.103046 | −0.02338 | 0.039833 | 0.126426 |
| 120 | 0.757801 | 0.1013255 | −0.0222575 | 0.039534 | 0.123583 |
| 121 | 0.764 | 0.099616 | −0.021186 | 0.039215 | 0.120802 |
| 122 | 0.770089 | 0.097916 | −0.020166 | 0.038875 | 0.118082 |
| 123 | 0.776068 | 0.0962285 | −0.0191965 | 0.038516 | 0.115425 |
| 124 | 0.78194 | 0.0945535 | −0.0182775 | 0.038138 | 0.112831 |
| 125 | 0.787707 | 0.0928905 | −0.0174105 | 0.03774 | 0.110301 |
| 126 | 0.79337 | 0.0912415 | −0.0165935 | 0.037324 | 0.107835 |
| 127 | 0.798932 | 0.089606 | −0.015826 | 0.03689 | 0.105432 |
| 128 | 0.804395 | 0.0879845 | −0.0151085 | 0.036438 | 0.103093 |
| 129 | 0.809759 | 0.086376 | −0.01444 | 0.035968 | 0.100816 |
| 130 | 0.815028 | 0.084784 | −0.013818 | 0.035483 | 0.098602 |
| 131 | 0.820203 | 0.0832065 | −0.0132425 | 0.034982 | 0.096449 |
| 132 | 0.825286 | 0.081644 | −0.012712 | 0.034466 | 0.094356 |
| 133 | 0.830278 | 0.0800975 | −0.0122255 | 0.033936 | 0.092323 |
| 134 | 0.835181 | 0.0785665 | −0.0117825 | 0.033392 | 0.090349 |
| 135 | 0.839997 | 0.0770515 | −0.0113795 | 0.032836 | 0.088431 |
| 136 | 0.844727 | 0.075552 | −0.011016 | 0.032268 | 0.086568 |
| 137 | 0.849373 | 0.074069 | −0.010691 | 0.031689 | 0.08476 |
| 138 | 0.853937 | 0.0726035 | −0.0104015 | 0.031101 | 0.083005 |
| 139 | 0.858419 | 0.0711535 | −0.0101475 | 0.030503 | 0.081301 |
| 140 | 0.862822 | 0.0697205 | −0.0099265 | 0.029897 | 0.079647 |
| 141 | 0.867147 | 0.068303 | −0.009737 | 0.029283 | 0.07804 |
| 142 | 0.871395 | 0.0669035 | −0.0095775 | 0.028663 | 0.076481 |
| 143 | 0.875568 | 0.06552 | −0.009446 | 0.028037 | 0.074966 |
| 144 | 0.879667 | 0.0641535 | −0.0093415 | 0.027406 | 0.073495 |
| 145 | 0.883694 | 0.062804 | −0.009262 | 0.026771 | 0.072066 |
| 146 | 0.887649 | 0.061471 | −0.009205 | 0.026133 | 0.070676 |
| 147 | 0.891535 | 0.060155 | −0.009171 | 0.025492 | 0.069326 |
| 148 | 0.895352 | 0.058856 | −0.009156 | 0.02485 | 0.068012 |
| 149 | 0.899101 | 0.057573 | −0.009161 | 0.024206 | 0.066734 |
| 150 | 0.902785 | 0.0563075 | −0.0091795 | 0.023564 | 0.065487 |
| 151 | 0.906403 | 0.055057 | −0.009219 | 0.022919 | 0.064276 |
| 152 | 0.909958 | 0.053824 | −0.009272 | 0.022276 | 0.063096 |
| 153 | 0.91345 | 0.052608 | −0.009342 | 0.021633 | 0.06195 |
| 154 | 0.916881 | 0.0514065 | −0.0094285 | 0.020989 | 0.060835 |
| 155 | 0.920251 | 0.050222 | −0.009532 | 0.020345 | 0.059754 |
| 156 | 0.923563 | 0.049055 | −0.009651 | 0.019702 | 0.058706 |
| 157 | 0.926816 | 0.0479025 | −0.0097885 | 0.019057 | 0.057691 |
| 158 | 0.930012 | 0.0467665 | −0.0099425 | 0.018412 | 0.056709 |
| 159 | 0.933151 | 0.045646 | −0.010114 | 0.017766 | 0.05576 |
| 160 | 0.936236 | 0.044542 | −0.010302 | 0.01712 | 0.054844 |
| 161 | 0.939267 | 0.0434525 | −0.0105085 | 0.016472 | 0.053961 |
| 162 | 0.942244 | 0.0423785 | −0.0107325 | 0.015823 | 0.053111 |
| 163 | 0.945169 | 0.04132 | −0.010974 | 0.015173 | 0.052294 |
| 164 | 0.948043 | 0.0402765 | −0.0112305 | 0.014523 | 0.051507 |
| 165 | 0.950867 | 0.039249 | −0.011505 | 0.013872 | 0.050754 |
| 166 | 0.953641 | 0.0382355 | −0.0117955 | 0.01322 | 0.050031 |
| 167 | 0.956367 | 0.0372375 | −0.0121035 | 0.012567 | 0.049341 |
| 168 | 0.959045 | 0.0362535 | −0.0124295 | 0.011912 | 0.048683 |
| 169 | 0.961676 | 0.0352835 | −0.0127715 | 0.011256 | 0.048055 |
| 170 | 0.964262 | 0.034328 | −0.013132 | 0.010598 | 0.04746 |
| 171 | 0.966802 | 0.0333865 | −0.0135065 | 0.00994 | 0.046893 |
| 172 | 0.969298 | 0.0324595 | −0.0138955 | 0.009282 | 0.046355 |
| 173 | 0.97175 | 0.031546 | −0.014296 | 0.008625 | 0.045842 |
| 174 | 0.97416 | 0.0306475 | −0.0147095 | 0.007969 | 0.045357 |
| 175 | 0.976527 | 0.0297605 | −0.0151405 | 0.00731 | 0.044901 |
| 176 | 0.978853 | 0.0288875 | −0.0155875 | 0.00665 | 0.044475 |
| 177 | 0.981139 | 0.028028 | −0.01605 | 0.005989 | 0.044078 |
| 178 | 0.983385 | 0.0271805 | −0.0165285 | 0.005326 | 0.043709 |
| 179 | 0.985591 | 0.0263475 | −0.0170115 | 0.004668 | 0.043359 |
| 180 | 0.98776 | 0.025527 | −0.017497 | 0.004015 | 0.043024 |
| 181 | 0.989891 | 0.024719 | −0.017991 | 0.003364 | 0.04271 |
| 182 | 0.991984 | 0.023923 | −0.018491 | 0.002716 | 0.042414 |
| 183 | 0.994041 | 0.023139 | −0.019007 | 0.002066 | 0.042146 |
| 184 | 0.996062 | 0.022368 | −0.019572 | 0.001398 | 0.04194 |
| 185 | 0.998048 | 0.0216075 | −0.0201935 | 0.000707 | 0.041801 |
| 186 | 1 | 0.02086 | −0.02086 | 0 | 0.04172 |
| 187 | 1 | 0.02086 | −0.02086 | 0 | 0.04172 |

FIG. 5F illustrates a two-dimensional view of an example embodiment of vertical stabilizer 500. In the illustrated embodiment, vertical stabilizer 500 has a quadrilateral shape with four sides that include a base 501, tip 503, leading edge 502, and trailing edge 504, and the shape is tapered from the base to the tip. In some embodiments, vertical stabilizer 500 may be implemented using the following design parameters: a root chord of 43.0 inches, tip chord of 34.5 inches, total area of 23.516 square feet, true span of 87.390 inches, maximum thickness (measured as a percentage of chord length) of 25% at the root and 30% at the tip, leading edge sweep of 25.0 degrees, cant of 15.0 degrees, aspect ratio of 2.255, mean chord of 38.905 inches, and fixed angle of incidence of 2.0 degrees. Moreover, in some embodiments, vertical stabilizer 500 may be positioned on a rotorcraft using the following waterline (WL), butt line (BL), and fuselage station (FS) locations: root 501 at WL 67.4; tip 503 at WL 151.812; leading edge and root corner 505a at FS 624.019 and BL 3.172; leading edge and tip corner 505b at FS 664.600 and BL −19.187; trailing edge and root corner 505c at FS 667.019 and BL 3.172; trailing edge and tip corner 505d at FS 699.100 and BL −19.187; and a mean aerodynamic center (MAC) at FS 654.722, BL −7.599, and WL 108.070.

The various design and configuration parameters described for vertical stabilizer 500 are merely examples associated with a particular embodiment. In other embodiments and/or aircraft, vertical stabilizer 500 may be implemented using varying design and configuration parameters.

Figure 6A:
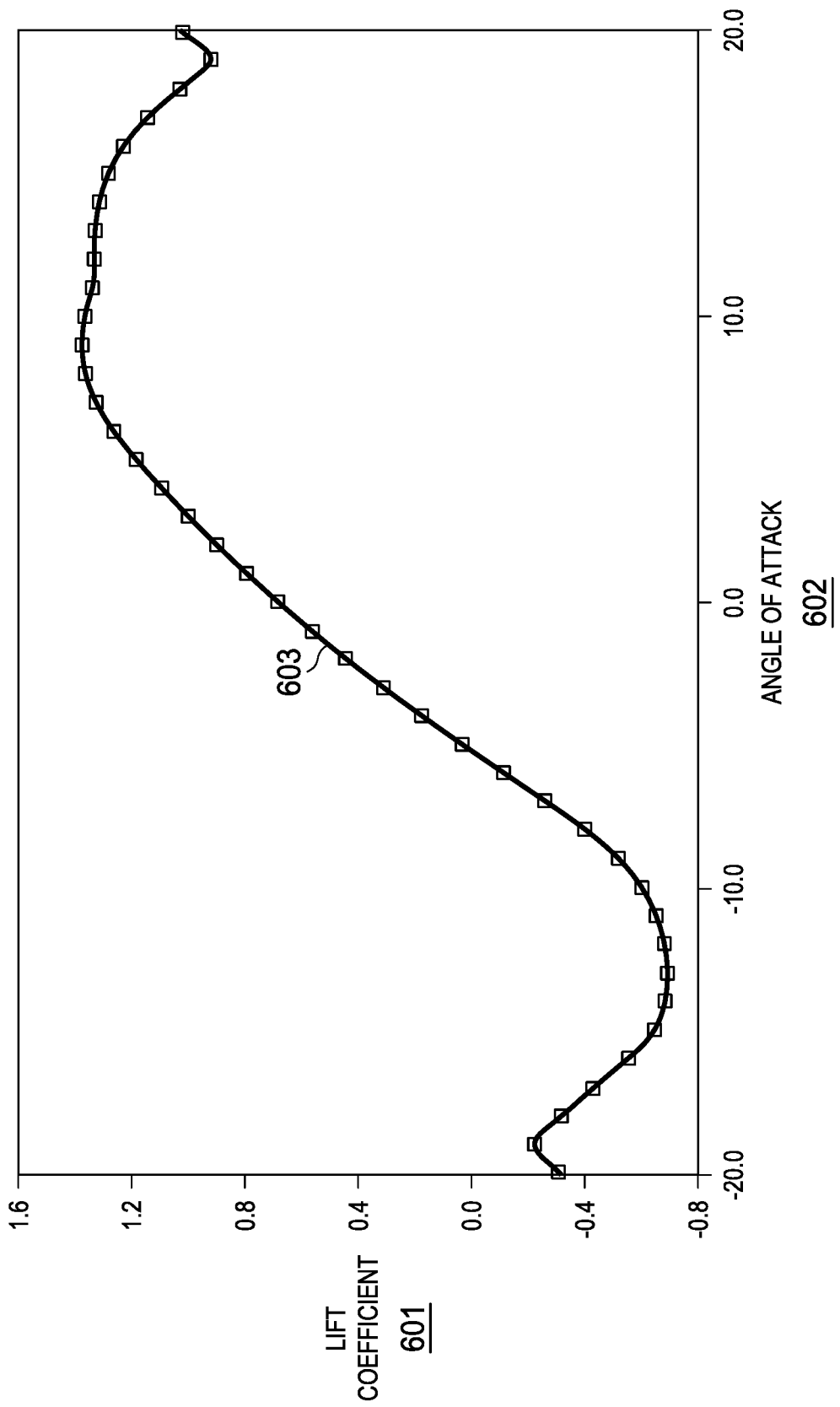
FIGS. 6A-B illustrate performance graphs for an example embodiment of a vertical stabilizer.
Figure 6B:
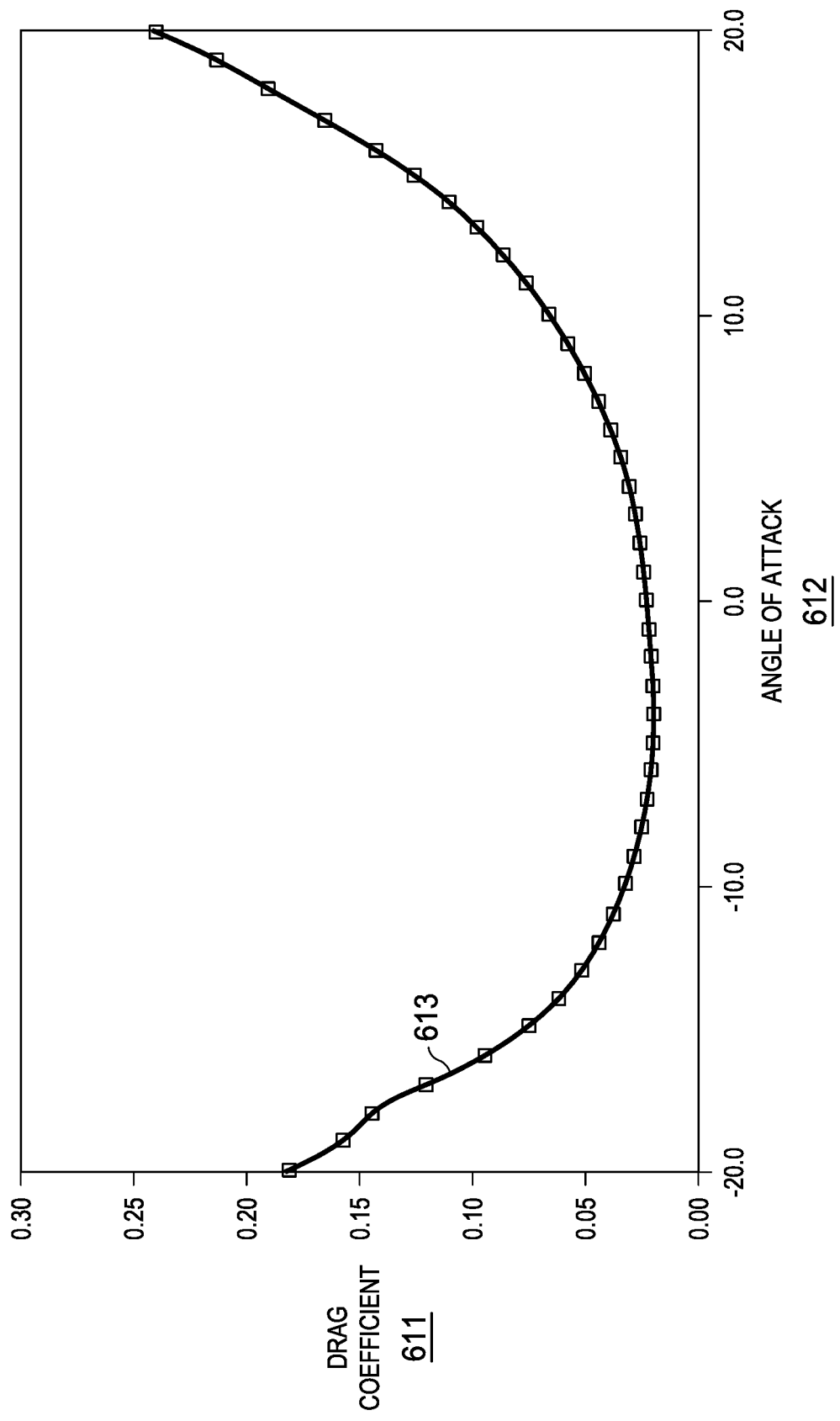

FIGS. 6A-B illustrate performance graphs for an example embodiment of the vertical stabilizer of FIGS. 5A-F. The graph of FIG. 6A plots 603 the lift coefficient 601 of the vertical stabilizer at varying angles of attack 602, and the graph of FIG. 6B plots 613 the drag coefficient 611 of the vertical stabilizer at varying angles of attack 612. As reflected by the graphs of FIGS. 6A and 6B, the design of the vertical stabilizer of FIGS. 5A-F results in favorable aerodynamic qualities, including lift produced laterally for yaw stability, anti-torque control, and offsetting the tail rotor thrust in forward flight, while also minimizing the flow separation and drag.

Figure 7:
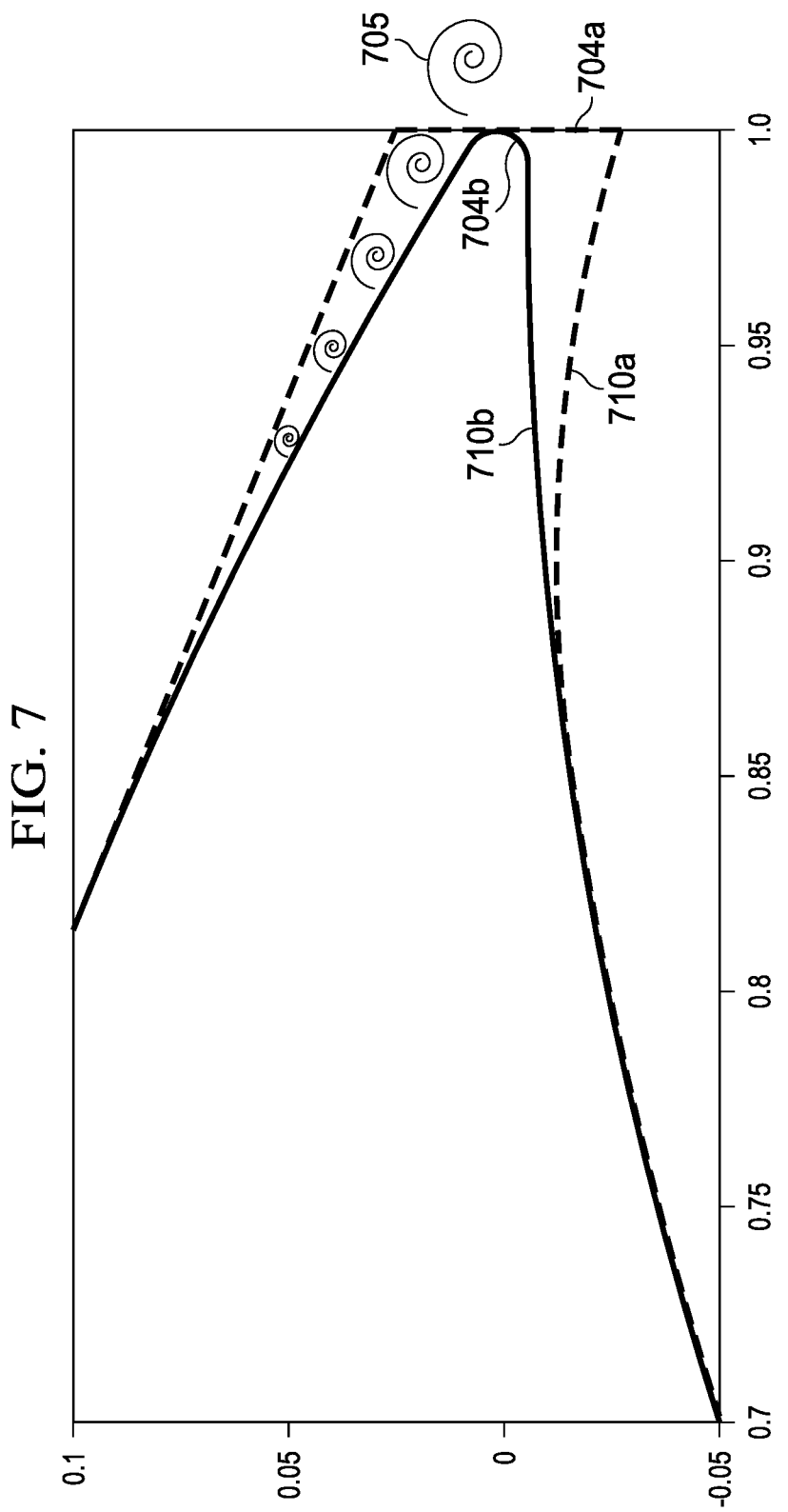
FIG. 7 illustrates a comparison of trailing edge shapes for a vertical stabilizer.

FIG. 7 illustrates a comparison of trailing edge shapes for a vertical stabilizer. The illustrated example provides a zoomed in view of two airfoil shapes 710a and 710b. Airfoil shape 710a has a blunt trailing edge 704a (e.g., similar to the vertical stabilizer of FIGS. 5A-F), while airfoil shape 710b has a pointed trailing edge 704b. As shown in the illustrated example, the pointed trailing edge 704b of airfoil shape 710b causes early airflow 705 separation because its curvature is too sharp for the airflow 705 to stay attached, and this early airflow separation results in increased drag. By contrast, the blunt trailing edge 704a reduces the thickness tapering on the aft end (without having to modify the desired chord length), and the reduced thickness tapering delays airflow separation as far aft on the airfoil as possible, thus minimizing drag caused by airflow separation. Accordingly, in some embodiments, a vertical stabilizer may be implemented using a blunt trailing edge and reduced thickness tapering on the aft end to minimize flow separation and reduce drag. Moreover, a blunt trailing edge can also reduce manufacturing complexity.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A horizontal stabilizer, comprising:
   an airfoil structure configured to be mounted to an aircraft at a horizontal orientation, wherein:
      the airfoil structure comprises a leading edge, a trailing edge, a top surface, and a bottom surface;
   a shape of the airfoil structure is cambered, wherein a camber shape of the airfoil structure forms a concave slope on the top surface and a convex slope on the bottom surface;
   the airfoil structure comprises a right outboard end, a left outboard end; and
   the horizontal stabilizer is a fixed structure with no slats or adjustable control surfaces.

2. The horizontal stabilizer of claim 1, wherein the aircraft comprises a rotorcraft.

3. The horizontal stabilizer of claim 1, wherein the airfoil structure is further configured to be mounted on an aft end of the aircraft.

4. The horizontal stabilizer of claim 1, wherein the airfoil structure is further configured to be mounted on a vertical stabilizer structure.

5. The horizontal stabilizer of claim 1, wherein the horizontal stabilizer is configured to be mounted at a fixed angle of incidence.

6. The horizontal stabilizer of claim 5, wherein the horizontal stabilizer is configured to be mounted at the fixed angle of incidence to produce lift to level the aircraft during flight.

7. The horizontal stabilizer of claim 5, wherein the fixed angle of incidence comprises an angle in a range from −0.5 degrees to −2.0 degrees.

8. The horizontal stabilizer of claim 1, wherein a maximum thickness of the horizontal stabilizer comprises 12% of a chord length of the horizontal stabilizer.

9. The horizontal stabilizer of claim 1, wherein the camber shape of the airfoil structure is configured to produce lift to stabilize a pitch of the aircraft.

10. A rotorcraft, comprising:
a horizontal stabilizer, wherein the horizontal stabilizer comprises a horizontal airfoil structure, and wherein:
the horizontal airfoil structure comprises a leading edge, a trailing edge, a top surface, and a bottom surface;
a shape of the horizontal airfoil structure is cambered, wherein a camber shape of the horizontal airfoil structure forms a concave slope on the top surface and a convex slope on the bottom surface;
the airfoil structure comprises a right outboard end, a left outboard end; and
the horizontal stabilizer is a fixed structure with no slats or adjustable control surfaces.

11. The rotorcraft of claim 10, wherein the horizontal stabilizer is mounted on an aft end of the rotorcraft.

12. The rotorcraft of claim 10:
wherein the rotorcraft further comprises a vertical stabilizer; and
wherein the horizontal stabilizer is mounted on a structure associated with the vertical stabilizer.

13. The rotorcraft of claim 10, wherein the horizontal stabilizer is mounted at a fixed angle of incidence.

14. An aircraft, comprising:
a vertical stabilizer; and
a horizontal stabilizer, wherein the horizontal stabilizer comprises a horizontal airfoil structure, and wherein:
the horizontal airfoil structure comprises a leading edge, a trailing edge, a top surface, and a bottom surface;
a shape of the horizontal airfoil structure is cambered, wherein a camber shape of the horizontal airfoil structure forms a concave slope on the top surface and a convex slope on the bottom surface;
the airfoil structure comprises a right outboard end, a left outboard end; and
the horizontal stabilizer is a fixed structure with no slats or adjustable control surfaces.

* * * * *